US010810695B2

(12) United States Patent
Knopp et al.

(10) Patent No.: US 10,810,695 B2
(45) Date of Patent: Oct. 20, 2020

(54) METHODS AND SYSTEMS FOR SECURITY TRACKING AND GENERATING ALERTS

(71) Applicant: AVA INFORMATION SYSTEMS GMBH, Berlin (DE)

(72) Inventors: Sascha Martin Tobias Knopp, Hamburg (DE); Aleksandar Stojanovic, Düsseldorf (DE)

(73) Assignee: AVA Information Systems GmbH, Berlin (DE)

( * ) Notice: Subject to any disclaimer, the term of this patent is extended or adjusted under 35 U.S.C. 154(b) by 262 days.

(21) Appl. No.: 15/625,982

(22) Filed: Jun. 16, 2017

(65) Prior Publication Data

US 2018/0189913 A1    Jul. 5, 2018

Related U.S. Application Data

(60) Provisional application No. 62/441,325, filed on Dec. 31, 2016.

(51) Int. Cl.
| | | |
|---|---|---|
| *G06Q 10/10* | (2012.01) | |
| *G06Q 30/02* | (2012.01) | |
| *G06Q 40/08* | (2012.01) | |
| *G06Q 10/08* | (2012.01) | |
| *G06Q 50/26* | (2012.01) | |
| *H04W 4/02* | (2018.01) | |
| *H04W 4/90* | (2018.01) | |

(Continued)

(52) U.S. Cl.
CPC .......... *G06Q 50/265* (2013.01); *G06N 20/00* (2019.01); *H04W 4/023* (2013.01); *H04W 4/029* (2018.02); *H04W 4/90* (2018.02)

(58) Field of Classification Search
CPC ..... G06Q 50/265; G06N 20/00; H04W 4/023; H04W 4/90; H04W 4/029
USPC .................................................. 705/1.1–912
See application file for complete search history.

(56) References Cited

U.S. PATENT DOCUMENTS

| 7,126,467 B2 | 10/2006 | Albert et al. |
| 8,024,330 B1 * | 9/2011 | Franco .................... G06F 16/00 |
| | | 707/724 |

(Continued)

FOREIGN PATENT DOCUMENTS

| CA | 2773749 A1 | 10/2012 |
| CA | 2781251 A1 | 12/2013 |

(Continued)

*Primary Examiner* — Jonathan P Ouellette
(74) *Attorney, Agent, or Firm* — Kyle M. St. James; Rutan & Tucker, LLP

(57) ABSTRACT

A computerized method for monitoring, analyzing, normalizing, applying, predicting, etc., various conditions. The method may comprise receiving data from a source over a channel, generating a report based on the data. The report may contain information associated with one or more events assembled in a standardized format responsive to determining the report corresponds to a first existing incident. The method may include supplementing an existing incident with the information of the report, the existing incident being one of a plurality of existing incidents stored in a database and including information corresponding to one or more events at a specified location and a specified time. The method may also include generating a location-score at a specified location and/or a safety-score for an individual, object, and/or asset at the specified location.

20 Claims, 12 Drawing Sheets

(51) Int. Cl.
*G06N 20/00* (2019.01)
*H04W 4/029* (2018.01)

(56) References Cited

U.S. PATENT DOCUMENTS

| | | | |
|---|---|---|---|
| 8,483,654 | B2 | 7/2013 | Levinson et al. |
| 8,515,673 | B2 | 8/2013 | Trinko et al. |
| 8,538,374 | B1 | 9/2013 | Haimo et al. |
| 8,612,136 | B2 | 12/2013 | Levine et al. |
| 8,624,727 | B2 | 1/2014 | Saigh et al. |
| 8,718,910 | B2 | 5/2014 | Gueziec |
| 8,732,091 | B1 | 5/2014 | Abhyanker |
| 8,738,422 | B2 | 5/2014 | Lerner et al. |
| 8,760,290 | B2 | 6/2014 | Piett et al. |
| 8,762,035 | B2 | 6/2014 | Levine et al. |
| 8,768,291 | B2 | 7/2014 | Williams et al. |
| 8,769,393 | B1 | 7/2014 | Abhyanker |
| 8,805,698 | B2 * | 8/2014 | Stiles .............. G06Q 10/06 705/1.1 |
| 8,805,707 | B2 * | 8/2014 | Schumann, Jr. ............ G08G 1/096775 705/4 |
| 8,832,841 | B2 | 9/2014 | Archer et al. |
| 9,014,661 | B2 * | 4/2015 | deCharms ............ H04W 4/021 455/404.2 |
| 9,212,930 | B2 | 12/2015 | Tayar et al. |
| 9,734,456 | B1 * | 8/2017 | Marino .............. G06F 16/29 |
| 9,817,843 | B2 * | 11/2017 | Mukherjee ........... G06Q 10/10 |
| 9,820,120 | B2 * | 11/2017 | deCharms ........... H04W 4/021 |
| 9,852,599 | B1 * | 12/2017 | Slavin .................. H04W 4/90 |
| 10,003,945 | B2 * | 6/2018 | Papakonstantinou ................ H04W 4/023 |
| 10,051,413 | B2 * | 8/2018 | Faraone ............... H04W 4/90 |
| 10,278,050 | B2 * | 4/2019 | Winkler .............. H04W 4/90 |
| 2003/0171870 | A1 * | 9/2003 | Gueziec ............... G01C 21/26 701/423 |
| 2008/0255754 | A1 * | 10/2008 | Pinto ............... G01C 21/3691 701/119 |
| 2009/0018850 | A1 | 1/2009 | Abhyanker |
| 2009/0024740 | A1 | 1/2009 | Abhyanker |
| 2009/0088967 | A1 | 4/2009 | Lerner et al. |
| 2011/0046920 | A1 | 2/2011 | Amis |
| 2011/0143776 | A1 | 6/2011 | Shankaranarayanan et al. |
| 2011/0213628 | A1 | 9/2011 | Peak et al. |
| 2012/0066345 | A1 | 3/2012 | Rayan et al. |
| 2013/0231077 | A1 | 9/2013 | Cahill |
| 2014/0087780 | A1 | 3/2014 | Abhyanker et al. |
| 2014/0123247 | A1 | 5/2014 | Abhyanker |
| 2014/0136328 | A1 | 5/2014 | Abhyanker |
| 2014/0136624 | A1 | 5/2014 | Abhyanker |
| 2014/0143004 | A1 | 5/2014 | Abhyanker |
| 2014/0200963 | A1 | 7/2014 | Abhyanker |
| 2014/0201749 | A1 | 7/2014 | Bao et al. |
| 2014/0222534 | A1 | 8/2014 | Abhyanker |
| 2014/0230030 | A1 | 8/2014 | Abhyanker |
| 2014/0266702 | A1 | 9/2014 | Forster-Knight |
| 2014/0278074 | A1 | 9/2014 | Annapureddy et al. |
| 2014/0282912 | A1 | 9/2014 | Quigg et al. |
| 2014/0287711 | A1 | 9/2014 | Williams et al. |
| 2015/0163312 | A1 | 6/2015 | Maguire et al. |
| 2015/0245189 | A1 * | 8/2015 | Nalluri .............. G06Q 50/265 455/404.1 |
| 2017/0193807 | A1 * | 7/2017 | Samara ............... G08B 25/016 |

FOREIGN PATENT DOCUMENTS

| | | |
|---|---|---|
| CN | 1838789 A | 9/2006 |
| CN | 102750830 A | 10/2012 |
| EP | 2759093 A2 | 7/2014 |
| WO | 2012065188 A2 | 5/2012 |
| WO | 2012145524 A1 | 10/2012 |
| WO | 2013072925 A2 | 5/2013 |
| WO | 2014036355 A1 | 3/2014 |
| WO | 2014047695 A2 | 4/2014 |
| WO | 2014060786 A1 | 4/2014 |
| WO | 2014106110 A1 | 7/2014 |
| WO | 2014158289 A2 | 10/2014 |

* cited by examiner

METHODS AND SYSTEMS FOR SECURITY TRACKING AND GENERATING ALERTS

PRIORITY

This application claims the benefit of and priority to the U.S. Provisional Application, entitled "Methods and Systems For Security Tracking and Generating Alerts," filed on Dec. 31, 2016 having application Ser. No. 62/441,325, which is incorporated by reference herein in its entirety.

BACKGROUND

Various computing devices, including mobile electronic devices, may be capable of accessing the internet. These computing devices might be used as sources for the collection of large amounts of data that may be relevant to various users and applications. Data might be collected from a plurality of sources (e.g., various computing devices) and may be stored on large server databases such as, for example, cloud storage. The collection of data via electronic devices though network connectivity may be called mobile crowdsourcing. Mobile crowdsourcing has great potential for beneficial real-time data gathering that may, for example, provide insight to ongoing events, crises, natural disasters, etc.

Given the large amounts of data that might be collected, whether real-time or past data, it may be difficult to sort the data and identify relevant information. Analysis on the commonality of information, patterns, etc., detailed in the data may be beneficial and may help simplify the information as well as find predictive information or other useful insights. As one example, it might be beneficial to analyze data from a variety of sources in an area to determine relevant information about conditions or events in the area. An application that can obtain and properly analyze large amounts of data, e.g., real-time, crowd-sourced data, and/or past data, may provide many benefits.

Various systems, devices/apparatuses, methods, etc., are described herein that may be used to beneficially analyze collected data—both real-time data and past data—to develop intelligence pertaining to a safety level of a specified location at a specified time that accounts for current ongoing events and incidents as well as past events and incidents, wherein the events or incidents may include, for example, crimes, social demonstrations, natural disasters, etc. Further, the systems, devices/apparatuses, methods, etc., may beneficially be used to analyze the collected data and generate one or more patterns of incidents and/or events in order to provide a predictive safety level of a specified location and/or predict one or more specific incidents and/or events based on a generated pattern. Additionally, the systems, devices/apparatuses, methods, etc., may beneficially provide alerts to users of electronic devices, objects that are configured to connect to a network and/or the internet (such as smart cars, smart home systems, etc.) and other assets as a warning of a dangerous situation, a predicted incident and/or event (e.g., a crime) or notice of a current safety level of the location of the user, object or asset.

SUMMARY

This summary is meant to provide some examples and is not intended to be limiting of the scope of the invention in any way. The description herein relates to systems, methods, devices, networks, messages, communication methods, services, mobile devices, etc., that may be utilized for safety monitoring, prediction, communication, and/or other things by a user. These can utilize logic that may receive a set of parameters as input that may be graphically displayed, or may be analyzed and new data generated and graphically displayed, to a user after the parameters have been received as input. Additionally, the received input may be sent and graphically displayed on another device (e.g., phone, computer, mobile device, etc.). Various features and steps as described elsewhere in this disclosure may be included in the examples summarized herein.

Various systems, devices, mediums, methods, etc., may be provided to tracking how safe a user is in a location at a time. These may include any of the features, components, steps, etc., described elsewhere herein. In one embodiment, systems and methods may be used for generating a level of safety of a specified location (e.g. an exact location, a narrow-range location, a region/broad-range location, etc.) at a specified time that indicates a safety level of the location (referred to herein as a "location-score"). For example, the generation of the location-score may be based on rules-based and/or machine-learning analyses of large volumes of collected data. In one embodiment, a computer-implemented method and system for generating a location-score of a current location of a user of an electronic device is based on analyses of large volumes of data including crowd-sourced data. Therefore, an alert including the location-score and behavioral guides based on the location-score may be provided. In one embodiment, a location may have multiple location-scores depending on various ranges encompassed in the location-score(s); for example, an exact location or a narrow-range location may have a first location-score associated with the narrow-range location and a second location-score associated with a broad-range location that encompasses the narrow-range location. Additional levels of location-scoring may be provided.

In one embodiment, a non-transitory storage medium may have stored thereon logic, the logic may be executable by one or more processors to perform operations described anywhere in this disclosure or that apply principles described in this disclosure. Some examples of operations may include the following: analyze data received from a first source; generate a report based on the data, the report containing event information associated with at least one event occurring at a first location, the event information assembled in a standardized format; access stored information in a database to determine whether (1) the report corresponds to a known incident, or (2) the report corresponds to a new incident; if it is determined that the report corresponds to a known incident, determine whether the report includes new information regarding the known incident, and if so, supplement existing incident information in the database that corresponds to the known incident with the new information regarding the known incident to generate updated existing incident information; if it is determined that the report corresponds to a new incident, generate new incident information regarding the new incident for storage in the database; and responsive to supplementing the stored information or responsive to generating the new incident information, generate a location-score for the first location based at least in part on the updated existing incident information or the new incident information. The data may be received from the first source over a channel. The channel may be or may have been assigned a trust score, and the trust score may be included with and/or be associated with the data. The location-score may be an updated location-score that may be updated from a previous location-score for the first location.

The known incident could include multiple events, e.g., each event of the multiple events may have occurred within a narrow-range location encompassing the first location, and wherein generating the location-score may include performing an analysis on information regarding the multiple events, the analysis being at least one of a rules-based analysis or a machine-learning analysis. Also, the database may include information regarding multiple incidents that may have occurred within either a narrow-range location or a broad-range location encompassing the first location, wherein the multiple incidents may include the first incident, and wherein generating the location-score may include performing an analysis on the information regarding the multiple incidents, and the analysis may be at least one of a rules-based analysis or a machine-learning analysis. An operation might include applying/combining a safety profile to a location-score to generate a custom location-score of a particular user, or this may be done for multiple users. As used herein, a "user" may include an individual person or an object (e.g., an automobile, a house or other residential building, a government or commercial building, a bicycle, a boat, etc.) Generating a location-score or operations to generate a location-score may take into account or involve analyzing stored information/data/etc., regarding multiple events and/or multiple incidents that may impact the location-score or a custom location-score (e.g., certain events and/or may impact (or not impact) the safety of different users differently based on characteristics of a user that may be stored in safety profiles of the different users and this may be analyzed and incorporated into the generation of a customized location-score).

The logic may also be executable by the one or more processors to perform operations including: analyzing additional data received from a second source; generate a second report based on the additional data, the second report containing additional event information associated with at least one event occurring at the first location, the additional event information assembled in the standardized format; accessing the updated existing incident information in the database; responsive to determining the second report corresponds to the first incident and that the report includes additional new information regarding the first incident, supplementing the updated existing incident information with the additional new information; and generating an updated location-score for the first location based at least in part on the updated existing incident information after it has been supplemented with the additional new information regarding the first incident. Other data received from other sources may be used to generate new incidents and/or update stored information regarding other existing incidents occurring or that occurred in or around the location or in other locations, and one, some, or all of these might be used/analyzed to generate the location-score or a custom location-score.

The logic may be executable by one or more processors to perform other operations to generate and track a location-score and/or custom location-score, to perform related functions or operations, and track the safety of a user in a location and/or at a time. Predictions and scores may also be generated based on locations where a user is moving/headed or planning to move/head. Surrounding area location-scores may also be generated to indicate the safety of areas outside of and/or adjacent to the user's location. An operation might include tracking a user's location at any given time or over time. Operations for Battery/power saving techniques may be used to minimize the battery or power consumed to track the user's location, e.g. only occasionally updating the location or location-score such as when the user or a user's device (e.g., phone, tablet, computer, etc.) moves more than a specified distance (e.g., more than 5-100 feet or other distances). Another operation may generate an alert to a user that includes the location-score or is indicative of the location-score (e.g., a numerical score, written words, spoken words, warnings, colors, sounds, etc.).

In one embodiment, a computerized method for generating a location-score may comprise some or all of the following (as well as unlisted steps): receiving data from a first source; generating a report based on the data, the report containing event information associated with at least one event occurring at a first location, the event information assembled in a standardized format; accessing stored information in a database to determine whether (1) the report corresponds to a known incident, or (2) the report corresponds to a new incident; if it is determined that the report corresponds to a known incident, determining whether the report includes new information regarding the known incident, and if it is determined that the report includes new information regarding the known incident, supplementing existing incident information in the database that corresponds to the known incident with the new information regarding the known incident to generate updated existing incident information; if it is determined that the report corresponds to a new incident, generating new incident information regarding the new incident for storage in the database; and responsive to supplementing the stored information or responsive to generating the new incident information, generating a location-score for the first location based at least in part on the updated existing incident information or the new incident information. In a second embodiment, a pre-report may be generated in response to the receipt of data from the first source. A pre-report may have the same structure as a report but may be sent to an operator for manual review as the content of the data received may not meet a predefined threshold of specificity. For example, a pre-report may be generated based on a posting via social media that includes the term "fire." In such a scenario, the pre-report may need confirmation by an operator that the data pertains to an incident for which a report should be generated (e.g., as opposed to a social media post about a barbecue, which would not be confirmed). Upon confirmation by the operator (e.g., approval), the pre-report is transitioned to a report and the computerized method discussed above continues. Additionally, any of the operations discussed above (e.g., as part of the logic above) or operations/steps discussed elsewhere in this disclosure may be performed as steps in the method; features/characteristics discussed elsewhere may also be included.

In one embodiment, a computerized method for evaluating how safe a user is (e.g., for evaluating a safety level) and/or for generating a location-score and/or custom location-score may include some or all of the following (as well as unlisted steps): receiving a trigger to generate a location-score and/or custom location-score, the trigger may include an indication that the user is in a location (or that the user may travel to a location, be headed to a location, etc.) and may include an indication of time (e.g., the user is in the location at a current time or is headed to the location and is expected to arrive at a future time); accessing stored information in a database, wherein the stored information may relate/correspond to one or more incidents within a predefined area that may include the location; performing an analysis on the stored information to generate (and generating) the location-score for the location, the location-score providing an indication of how safe the location is based at least in part on the stored information relating to the one or more incidents (and may be based or change based on time, e.g., morning, mid-day, evening, late night, day of the week, time of the year, proximity in time to a holiday or known event (e.g., Super Bowl, Mardi Gras festivities) or environmental factors may each influence generation of different location-scores for the location); and applying a safety profile corresponding to the user to the location-score to generate a custom location-score personalized to the user according to the safety profile. Additionally, any of the operations or steps discussed above or elsewhere in this disclosure may be performed as steps in the method; features/characteristics discussed elsewhere may also be included. For example, the method may include generating an alert to the user that includes, or is indicative of, one or more of the location-score and the customized location-score, and/or performing the analysis includes performing at least one of a rules-based analysis or a machine-learning analysis. The method may also include generating a second alert (and/or multiple additional alerts) that includes, or is indicative of, one or more of the location-score and the customized location-score, wherein the second alert (and/or multiple additional alerts) is transmitted to one or more additional users listed in a predefined list. For example, the predefined list might include one or more of a family member(s), friend(s), employer(s), and others. The safety profile may include characteristics (which may be detailed characteristics, e.g., World Health Organization (WHO) risk factors) of the user that may influence how safe the user is in the location, which may be different from how safe a different user with a different safety profile would be in the location. The safety profile might be stored in the same database as the stored information or in a different/separate database.

Other embodiments, steps, operations, features, etc., may be found in the detailed description below.

BRIEF DESCRIPTION OF THE DRAWINGS

The disclosed devices/apparatuses, systems, methods, etc., may be better understood with reference to the following drawings. The components in the drawings are not necessarily to scale.

Figure 1:
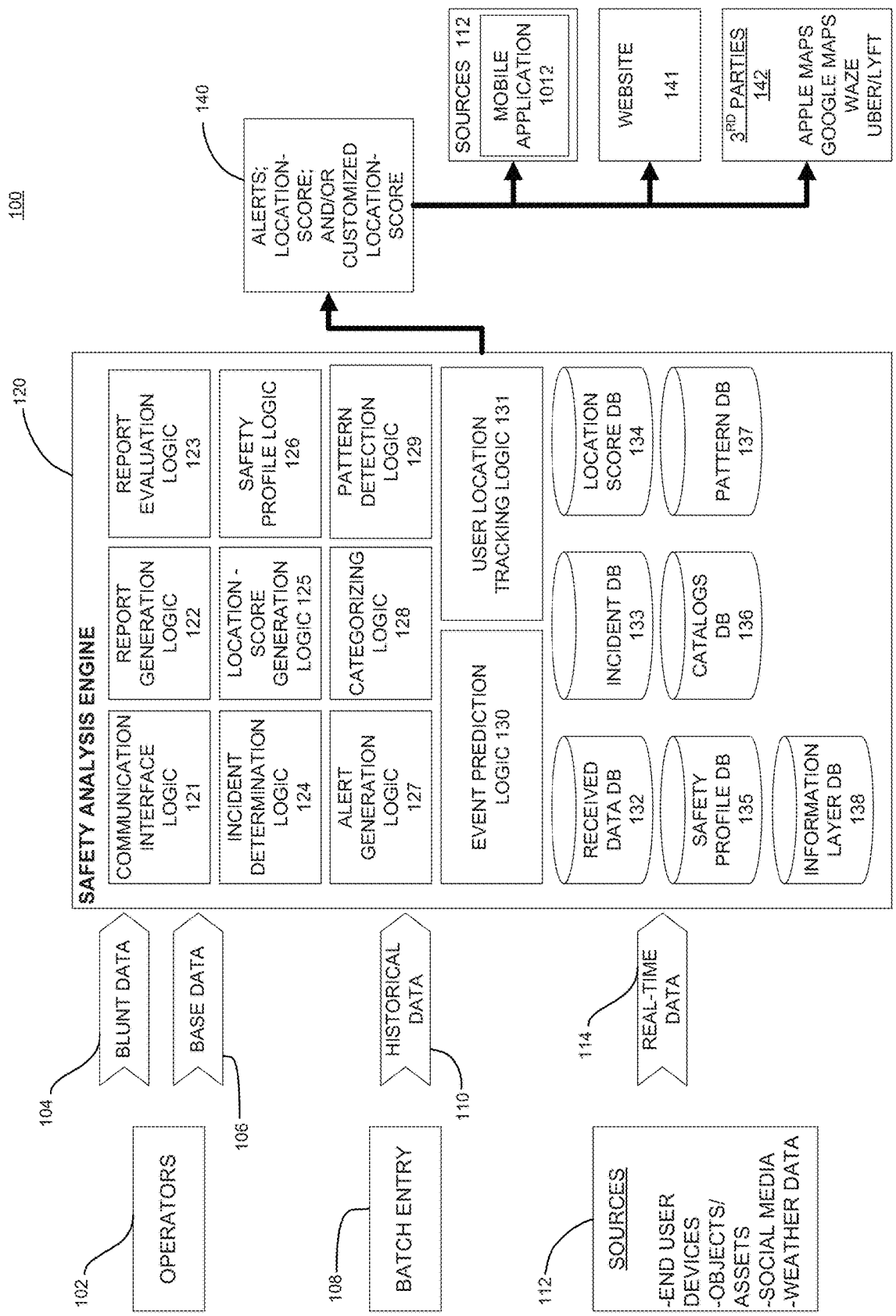
FIG. 1 shows an exemplary block diagram of an exemplary architecture of an exemplary system 100.

While the present disclosure is subject to various modifications and alternative forms, specific embodiments thereof have been shown by way of example in the drawings and will herein be described in detail. Like references indicate similar elements. The invention should be understood to not be limited to the particular forms disclosed, but on the contrary, the intention is to cover all modifications, equivalents, and alternatives falling within the spirit and scope of the present disclosure. It will be appreciated that the current illustrations are not limiting in their scope and that various features illustrated in different embodiments may be combined within a claimed embodiment.

DETAILED DESCRIPTION

The following description and accompanying figures, which describe and show certain embodiments, are made to demonstrate, in a non-limiting manner, several possible configurations of systems, platforms, devices, methods, etc., that may be used for various aspects and features of the present disclosure. As one example, various systems, devices/apparatuses, and methods are described herein, including systems, platforms, devices, methods, etc., that may relate to determining a location-score of an individual, object, and/or asset at a location or a potential location of the individual, object, and/or asset at a given time based on current, ongoing incidents and events, previous incidents and events, general notions of a geographic area surrounding the specified location, and/or other conditions/factors. In one embodiment, a safety analysis engine of the system described herein may perform the determination of a location-score, either generally for a specified location or specifically for an individual, object, and/or asset based on characteristics of the individual, object, and/or asset. Also, numerous specific details are set forth herein in order to provide a thorough understanding of the present disclosure; however, the invention disclosed herein may be practiced without one or more of these specific details.

The safety analysis engine may monitor data from one to many sources (e.g., the safety analysis engine may monitor mass or large volumes of data from two or more sources) and may generate a location-score as well as optionally a customized location-score (e.g., this may be based on characteristics of a source, user, object, asset, etc.). A location-score may represent an indication of the safety level of a particular geographic location (for example, a specific address, a specific block, a neighborhood, or other area) and may be based on, inter alia, one or more incidents, events, and/or categories of incidents/events. Examples of categories of incidents/events may include, for example, crime, fire, terrorism, weather, natural disasters, industrial disasters, defense, pollution, epidemics, etc. Local response times of police, fire departments, other services, etc., may also be factored into a location-score. The past and present conditions and incidents and/or events may be utilized by the system (e.g., condition analysis system, safety monitoring system, etc.) to provide a real-time statistical risk and safety analysis for any given location. Additionally, the safety analysis engine may provide a predictive risk analysis for any given location or for an individual, object, asset, etc., in the given location. As a result, the safety status of individuals, staff, buildings, objects, assets and even entire organizations can be monitored. Personalization—via a customized location-score—allows for contextual risk analyses, the provision of alerts and behavioral advice based on individual attributes such as gender, age, nationality, etc., with respect to persons and object or asset attributes such as brand, make, model, serial number, etc., with respect to objects or assets. Herein, the terms "customized location-score," "personal safety score," and "safety score" are used interchangeably.

The data utilized by the safety analysis engine may be collected in a variety of ways including by a human user manually entering data using an electronic device (e.g., a network device), an electronic device automatically requesting and/or sending data, a smart object (e.g., an object capable of connecting to the Internet or another network) requesting and/or sending data, operating software, and other ways. Data may also be collected via mining social media, e.g., via web-crawlers or programs that analyze Twitter feeds and/or other social media. Additionally, historical data such as prior crime reports may be requested and/or provided to the safety analysis engine (e.g., automatically from a database or other information source, manually via operators, etc.).

Subsequent to receiving data regarding an incident and/or event (e.g., a crime, a current weather condition, a natural disaster, etc.), the safety analysis engine may determine whether (1) the incident and/or event corresponds to existing incident information already stored within the safety analysis engine or associated database/memory, and the existing information should be updated with any new information, or (2) no information regarding the incident and/or event is stored within the safety analysis engine or associated database/memory, and information (e.g., information having a standardized format, like a report, record, entry, etc.) describing a new incident should be generated. As used herein "incident" may refer or correspond to a single event (e.g., thereby essentially being interchangeable with "event") or may refer or correspond to multiple related events that collectively make up the incident (e.g., a single crime incident may include a robbery event, one or more shooting events, one or more casualties/injuries, one or more property damage events, etc.). More negative events associated with an incident may cause the system to rate the incident as more serious than an incident with fewer events or just one event; however, the seriousness of an event(s) may also be weighted, e.g., a single murder incident/event may be rated/treated by the system as more serious than an incident with a series of minor vandalism events. Information (e.g., a report, record, entry, etc.) pertaining to the incident may be stored in a standardized format that enables the safety analysis engine to easily generate a location-score based on a plurality of incidents occurring at a location. In addition to such information, a "risk report" may also be included in the generation of a location-score by the safety analysis engine. A risk report may not necessarily include information pertaining to a specific event or incident but may rather include a warning about a potential risk, as for example, a statement issued by an office of foreign affairs regarding travel to specific locations. In one embodiment, a report, e.g., of a confirmed incident or event, may be supplemented with information included in a risk report. Further, each incident may be assigned to a category which sets forth the type of incident, and some categories may have multiple levels. Examples of categories may include crime, fire, social demonstration, natural disaster, cultural event, sporting event, or other categories. Additionally, "conditional tags" may be assigned to each incident, where a conditional tag may include information related to the environment present at the location in the moment of the incident (e.g., weather conditions, the time of the incident (day of week, month, time of day, season, specific weather conditions, etc.)). The conditional tags may be used in detection of patterns of incidents.

The generation, supplementation, or updating of a location-score may be periodic (e.g., triggered in accordance with a periodic time interval) or aperiodic (e.g., triggered in accordance with a request by a user, or by receipt of additional information or a report, e.g., for a specific location). Therefore, the location-score may be based on the user's current location or a location to which the user is traveling (for convenience, the phrase "the user's current location" will be discussed herein, but the discussion similarly applies to locations to which the user may be traveling, requests information for (e.g., to monitor a home, workplace, school, etc.), etc.). Upon determining the user's current location ("location" may refer to the user's exact location within a narrow range, e.g., maybe within 1-10 feet, or may encompass one or more predefined distance ranges, regions surrounding the user's exact location, e.g., maybe within 10 feet-10 miles or more; a narrow-range location may be an area within relatively narrow range, maybe within 10-1000 feet, a block, a neighborhood; a broad-range location or region may be an area within a broader range, maybe an area extending 1000 feet-10 miles or more, a city, a state, a country, etc.) the safety analysis engine determines all incidents that are located within the location (e.g., within predefined distance range that encompasses and surrounds the user's exact location). Subsequently, based on a set of predetermined rules (e.g., a first weighting system according to the category, severity, and/or rating of the incident), a location-score may be generated for the user's current location. Additionally, a second weighting system pertaining to the timing of each incident may be utilized in the location-score generation process. A location may have multiple location-scores depending on various ranges encompassed in the location-score(s); for example, an exact location or a narrow-range location may have a first location-score associated with the narrow-range location and a second location-score associated with a broad-range location that encompasses the narrow-range location, and additional levels are also possible.

A location-score may also be generated for a specific form of public transportation. For example, as opposed to a location-score being generated for a particular address or a particular public park, a location-score may be generated for a mode of travel such as a cruise ship, a subway line, a railroad line, an airline, a specific flight, or the like. In such an embodiment, incidents including events, regardless of geographic location, that pertain to the form of transportation may be taken into account when determining a location-score for the form of transportation.

As mentioned above, a customized location-score determined in accordance with a user's safety profile may be provided to the user. The customized location-score may be generated by the safety analysis engine (e.g., computers or hardware executing logic) or directly on a mobile application installed on a user's electronic device (e.g., a network device, laptop, tablet, phablet, mobile phone, smart watch, etc.). When the location-score is generated and updated directly on a mobile application on the user's device (as opposed to on a central system server, network, computer, etc.), the user may keep his or her safety profile anonymous from the system, safety analysis engine, and anyone without access to the user's device.

The safety analysis engine also may generate and transmit alerts based on generated location-scores and/or customized location-scores. An alert, which is capable of being provided in a number of formats, such as a text message, email, audio clip or the like, may notify a user, object, asset, friend, or family or employer thereof, etc., that a user, object or asset is in or approaching a geographic location having a location-score, or customized location-score, that is below a safety threshold (e.g., the system or user may send alerts at different safety levels, which may be set by the system or user). Additionally, an alert may also be generated based on receipt of a new report. Alerts may also provide behavioral advice, e.g., suggestions of actions to take to remain safe or avoid danger and/or directions on the safest way to exit a dangerous area, the location of safety shelters (e.g., in the event of emergencies such as earthquakes, floods, terrorist attacks, etc.) and/or safety/emergency equipment. Additionally, alerts may be generated and transmitted to government officials or offices, local fire departments, local police forces, etc., which may help them quickly and efficiently respond to incidents or more quickly identify locations that may require additional personnel or a visible presence of authorities. For example, in cases of severe incidents, a protocol may include a specific communication and/or a requirement to include a feedback loop with the officials to coordinate specific alerts or communication, i.e., in case of a terror attack in order to prevent panic.

The safety analysis engine may also perform pattern detection and event prediction processes. A pattern detection process may include analysis of data stored in one or more databases of the safety analysis engine to determine a pattern that may be time-based, location-based, event-based, and/or incident-based. An event prediction process may include performing a correlation of one or more recently generated (or detected) incidents with one or more patterns. The analysis determines whether one or more incidents correlates to one or more characteristics of a pattern and, upon determining a correlation above the predetermined threshold exists, predict a portion or portions of a pattern are likely to occur in the future. For example, a pattern may be detected by correlating data regarding a specific incident with other data such as weather-conditions or daylight-situations, types of venues within a predetermined distance from a specific location (e.g., train stations, football stadiums, etc.), demographics of locations (e.g., employment rate, average household income and/or age), or known public occurrences (e.g., holidays, specific religious days, etc.).

While specific embodiments are described herein, the invention is not to be limited to these embodiments, the invention is to be understood as not limited by the specific embodiments described herein, but only by scope of the appended claims. Features and details from one or more described embodiments may also be combined, added or removed to form other embodiments within the scope of the invention, as the described embodiments are merely exemplary of various features.

I. Terminology

In the following description, certain terminology is used to describe features of the invention. For example, in certain situations, the terms "logic" and/or "engine" may be representative of hardware, firmware and/or software that is configured to perform one or more functions. As hardware, logic may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic. Herein, the terms logic and engine may be used interchangeably.

Logic may be software in the form of one or more software modules, such as executable code in the form of an executable application, an application programming interface (API), a subroutine, a function, a procedure, an applet, a servlet, a routine, source code, object code, a shared library/dynamic link library, or one or more instructions. These software modules may be stored in any type of a suitable non-transitory (computer-readable) storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

The term "process" may include an instance of a computer program (e.g., a collection of instructions, also referred to herein as an application). In one embodiment, the process may be comprised of one or more threads executing concurrently (e.g., each thread may be executing the same or a different instruction concurrently).

The term "processing" may include execution of a binary or launching an application wherein launching should be interpreted as placing the application in an open state and, in some implementations, performing simulations of actions typical of human interactions with the application. For example, the application, an internet browsing application, may be processed such that the application is opened and actions such as visiting a website, scrolling the website page, and activating a link from the website are performed (e.g., the performance of simulated human interactions).

The term "network device" may be construed as any intelligent electronic device with the capability of connecting to a network. Such a network may be a public network such as the internet or a private network such as a wireless data telecommunication network, wide area network, a type of local area network (LAN), or a combination of networks. Examples of a network device may include, but are not limited or restricted to, a laptop, a server, a dedicated cybersecurity appliance, general purpose computer system, a mobile phone, a tablet, a phablet, etc. Examples of an electronic device may include, but are not limited or restricted to, a network device as defined above, a stationary device that includes one or more sensors and/or one or more processors, a connected car (e.g., including all connected systems and sensors associated with the connected car such as a connected navigation system, with the term "connected" referring to being configured to connect to a network), connected home systems (e.g., smart sensors such as a smoke detector or a motion sensor, smart lightbulbs, a smart TV, etc., and any central hub that may connected thereto with the terms "connected" and "smart" being used interchangeably herein), a seismograph, etc.

Specific numeric references may be made herein, for example, to a "first" component, source, etc. However, the specific numeric reference should not be interpreted as a literal sequential order but rather interpreted that, for example, the "first source" is different from a "second source," unless otherwise indicated.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The systems, platforms, devices, apparatuses, engines, servers, databases, methods, etc., herein may be utilized for generating a location-score for a location/region or a personalized location-score for a user, an object or an asset based on, for example, analyzing large volumes of data from multiple sources, wherein the data may cover incidents in various categories, e.g., crime, terrorism, fire, weather, natural and industrial disasters, events, etc. The location-score may enable users, objects, organizations, etc., to make the best possible, most well-informed safety-related decisions. As embodiments of many different forms are intended to be encompassed herein, it is intended that the present disclosure is to be considered as an example of principles and not intended to limit the disclosure to any specific embodiments shown or described.

II. The System

1. Architecture

FIG. 1 shows an exemplary block diagram of an exemplary architecture of a system 100, which may conduct analyses on received information to determine a safety level of a location. Additionally, prior to determining the safety level of the location, a preliminary analysis may be performed to determine a level of trust-worthiness of the received information that may result in a request for verification of the content of the received information. The system 100 may include a plurality of information providers, such as, operators 102, a batch entry system 108, and/or sources 112, for example, which provide data to the safety analysis engine 120. In some embodiments, the data provided by the sources may be transmitted over one or more channels (e.g., communication lines) to the safety analysis engine 120. The channels may be categorized on the data received over those channels into channel-types based on the information-provider (e.g., operators 102, batch entry 108 and sources 112). However, the categorization of channel types is not required. The safety analysis engine safety analysis engine 120 may include a plurality of logic components including (a) communication interface logic 121, (b) report generation logic 122, (c) report evaluation logic 123, (d) incident determination logic 124, (e) location-score generation logic 125, (f) safety-profile logic 126, (g) alert generation logic 127, (h) categorizing logic 128, (i) pattern detection logic 129, (j) event prediction logic 130 and/or (k) user-location tracking logic 131. Additionally, the safety analysis engine safety analysis engine 120 may include the following databases: (i) a received data and reports database 132, (ii) an incident database 133, (iii) a location-score database 134, (iv) a safety profile database 135, (v) a catalogs database 136, (vi) a pattern database 137 and/or (vi) an information layer database 138. After analyzing and processing received data, as will be discussed in detail below, the safety analysis engine 120 may generate and transmit one or more alerts to one or more of a plurality of recipients. The plurality of recipients may include the sources discussed above (e.g., forming a feedback loop) as well as others such as third-party applications or platforms (e.g., WAZE®, Apple® Maps, Google® Maps, etc.), one or more publicly or privately accessible websites, government entities, organizations, companies, etc.

The information providers may include the operators 102, the batch entry system 108, and the sources 112, all of which may provide data to the safety analysis engine 120. The operators 102 may transmit data to the safety analysis engine 120 and such data may be categorized as either blunt data 104 or base data 106. The base data 106 may include broad warnings, reviews of an area, etc. One example of base data 106 includes a travel warning provided by a country's office for foreign affairs warning travelers to take extra caution when traveling to a country, region, or city. The blunt data 104 may include a report and/or information associated with an incident or event and may be used by the safety analysis engine 120 to override the location-score generation logic 125. For example, the blunt data 104 may be entered manually by an operator 102 in order to provide the safety analysis engine 120 with a warning or set a location-score pertaining to a particular location (e.g., set an immediate location-score for an area within a predefined radius of a terrorist attack immediately following the attack). Alternatively, the blunt data 104 may include a default location score for a region for which the safety analysis engine 120 has received little information. In some embodiments, the blunt data 104 and the base data 106 may be provided by the operators in the form of a "risk report," as discussed above. The batch entry system 108 may transmit historical data 110, e.g., records of prior events and/or incidents. The historical data 110 may include any past event, incident, weather information, calendar information (day of week, month, year, etc.), hospital records.

Additionally, real-time data such as user observations, monitored data such as data from an accelerometer and/or a GPS, captured data such as pictures, video and sound recordings, weather data, social media data, other data, etc., may be transmitted over a real-time data channel 114. The real-time data may be transmitted by the sources 112 which include human users utilizing an electronic device (e.g., also referred to as network devices or end user devices), objects such as internet of things (IoT) devices (e.g., any device that may be capable of connecting to a network to upload data associated with the device), social media platforms (e.g., Twitter, Instagram, Facebook, etc.), weather data providers (e.g., government agencies and/or public or private corporations), etc. Real-time data may be collected periodically, for example, from social media (e.g., Twitter feeds, etc.), from users' electronic devices, from IoT devices, etc. Additionally, real-time data may be collected based on certain triggering events, such as accelerometer measurements above a predetermined threshold (i.e., possibly indicating an electronic device was dropped or the user of an electronic device fell), transmissions by a user via an electronic device (e.g., data input via an electronic device or captured by one or more sensors triggered by the user, etc.). It is also noted that real-time data may include "indications" of an event but not an explicit recitation of a crime, a fire, a natural disaster, etc. For example, a tweet from a Twitter feed may provide information that smoke can be seen coming from a specified building. The inclusion of smoke in the tweet indicates that a fire may be present in the specified building but does not explicitly state such. Thus, the information provided by the tweet is referred to herein as an "indication," may be included in a report, and may influence the location-score generation process. In one embodiment, an indication may be included in a rules-based analysis as discussed below (e.g., wherein each incident occurring in a predefined area is assigned a weight). Another example of an indication may be a report based on real-time analysis of the movement pattern of mobile phones. If for example, people at a specific square in a city start to scatter and abandon the location at a time where this is usually not the case, the movement pattern may be an indication of a flight pattern, which could result in the safety analysis engine 120 issuing a warning to people within a predefined proximity of the location (e.g., the square) to abandon or not enter closer into the respective area.

Referring now to the safety analysis engine 120, the communication interface logic 121 may receive the data, either as raw data or as a report (e.g., raw data in a standardized format), from the one or more sources over the one or more channels as discussed above. The communication interface logic 121 may facilitate the storage of the received data in the received data and reports database 132. The communication interface logic 121 also facilitates the transmission of alerts generated by the safety analysis engine 120 alert generation logic 127.

The report generation logic 122, when executed by one or more processors, may include functionality that causes the performance of operations that include obtaining raw data received by the safety analysis engine 120 and generating a report (placing the raw data in a standardized format). In one embodiment, raw data may be received in a continuous or segmented manner such that the report generation logic 122 may begin to generate a report without having all of the data for a complete report, e.g., one type of report may normally include a description of events, exact location or narrow-range location (e.g., address or GPS location as opposed to city, state, or broad region), time, etc., and the report may begin to generate without all that data. As the safety analysis engine 120 receives raw data from a particular source (e.g., in "segmented chunks"), the report generation logic 122 will amend a partially generated report to include the segmented chunks as they are received.

Figure 10:
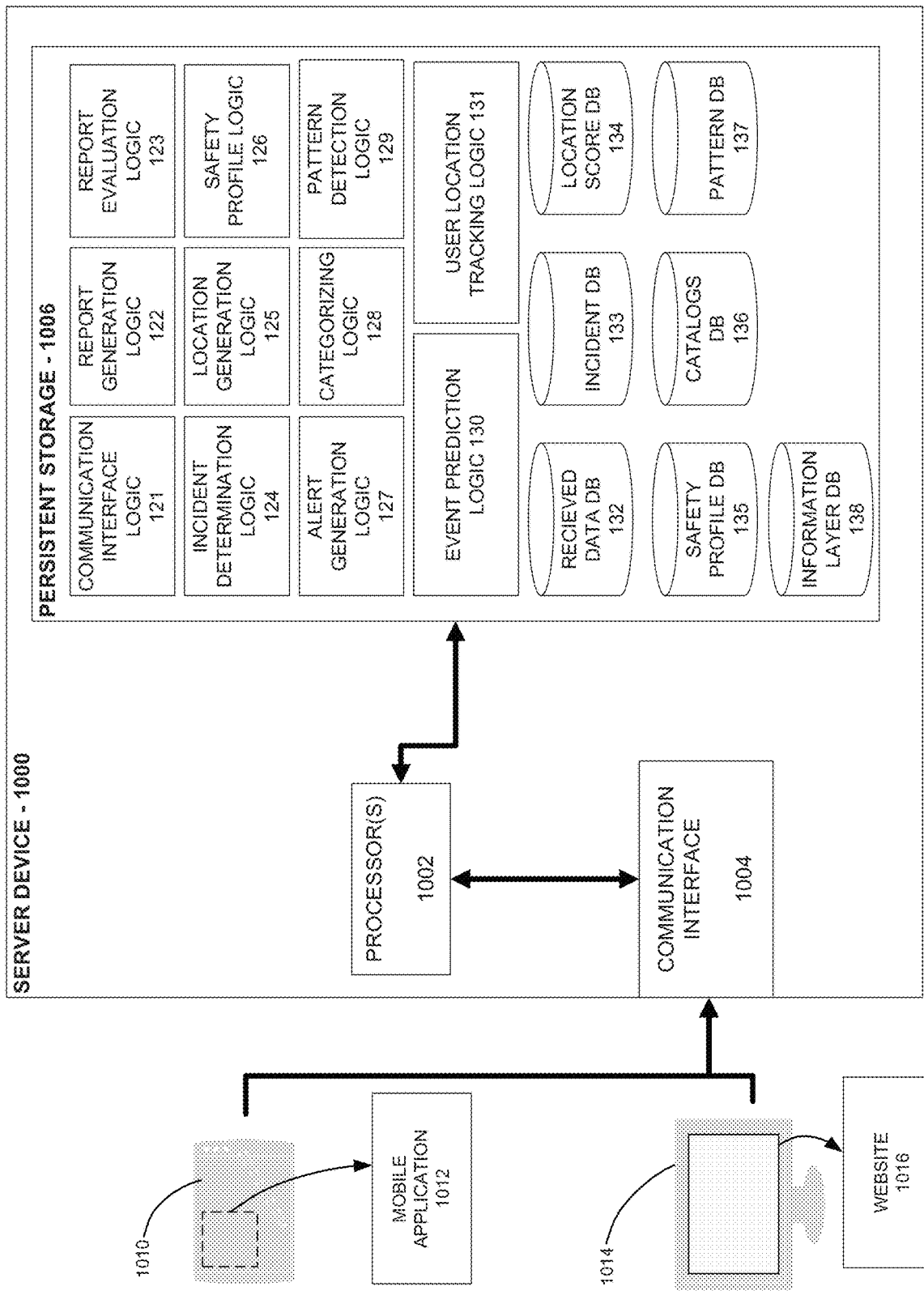
FIG. 10 is an exemplary embodiment of a logical representation of an exemplary system (e.g., system 100 shown in FIG. 1).

One purpose of having all data in a standardized format is to provide a standard format to the incident determination logic 124 discussed below. Specifically, data may be received by the safety analysis engine 120 in the form of a report (e.g., via manual generation of a report for data entry by an operator and/or via a report generated by a mobile application, as seen in FIG. 10) or as raw data (e.g., automatic capture of data by an electronic device, receipt of data from social media platforms via web crawlers, etc.). Additionally, having a standardized format provides for ease in comparison with existing incidents, as discussed below. Thus, the report generation logic 122 may include functionality to transform the raw data into the standardized format, thereby generating a report.

The report evaluation logic 123, when executed by one or more processors, may include functionality that causes the performance of operations that include evaluating a report (either received directly from a source or generated by the report generation logic 122) to determine whether the one or more events detailed in the report need to be verified prior to generating a new incident or supplementing an existing incident based on the information contained in the report. Raw data and reports received by the safety analysis engine 120 may be assigned a trust-score. Specifically, a source and a channel may each be assigned a trust-score, which represents the trust-worthiness of a source or a channel. When a source or channel has been assigned a trust-score, a report or raw data received therefrom may be assigned the same trust-score as the source or channel (a trust-score assigned to raw data may be subsequently be assigned to the report generated therefrom). Alternatively, if the source has not been assigned a trust-score, and the channel has been assigned a trust-score, the raw data or report may be assigned the trust-score of the channel. If neither the source nor the channel has been assigned a trust-score, the raw data or report may be assigned a default trust-score. The report evaluation logic 123 may determine whether the trust-score assigned to the report is equal to or greater than a predetermined threshold. When the trust-score of the report is equal to or greater than the predetermined threshold, the report evaluation logic 123 may determine the report is not in need of further verification. In contrast, when the report evaluation logic 123 determines the report is in need of further verification, authorities or alternative users may be prompted via alert using the mobile application 1012, the website 1016 or alternative methods. One purpose of verifying the event(s) or information contained in a report is to prevent false or inaccurate entries from influencing analyses performed by logic of the safety analysis engine 120. For example, the location-score generation logic 125 may be influenced by each report received or generated by the safety analysis engine 120; thus, false or inaccurate entries may result in unnecessary alerts being generated and transmitted to authorities, users or otherwise. Transmission of false or inaccurate alerts may result in drastic actions taken by authorities, users or otherwise that were not needed.

The incident determination logic 124 may include functionality that, when executed by one or more processors, may cause the performance of operations that include determining whether a report corresponds to an existing incident stored in the safety analysis engine 120. Additionally, responsive to determining the report does not correspond to an existing incident, the incident determination logic 124 may generate incident information (e.g., information stored in a standardized format that describes a new incident identified by the report). Alternatively, responsive to determining the report does correspond to an existing incident, the incident determination logic 124 may supplement (e.g., merge or enrich) the incident information corresponding to the existing incident with any new information included in the report. Further, the incident determination logic 124 may assign each incident to a category which sets forth the type of incident (i.e., the type of event(s) included within the incident).

Additionally, some categories may have multiple levels (wherein weights assigned to the incident for purposes of location-score generation may correspond to the level within a category, levels may have differing weights). Examples of categories may include, but are not limited or restricted to, general safety (which may be further expanded into multiple levels, e.g., crime, fire, terrorism, etc.); defense (which may be further expanded into multiple levels, e.g., national defense emergencies, security breaches, diplomatic crisis, etc.); health (which may be further expanded into multiple levels, e.g., allergies, epidemics, infections, pollution, etc.); nature (which may be further expanded into multiple levels, e.g., weather, water quality, seismology, solar, animals, etc.); industrial (which may be further expanded into multiple levels, e.g., vehicular infrastructure, data infrastructure, chemicals, toxins, etc.); social demonstrations (which may be further expanded into multiple levels, e.g., protest march, rally, standing protest, etc.); or the like. Furthermore, a level within a category may be expanded as well. For example, within the category of general safety, the level crime may be expanded further, e.g., murder, burglary, theft/pick-pocket, assault, sexual assault, etc. All incidents may be stored in the incident database 133. Stored incident may be used during location-score generation, pattern detection and incident detection processes as will be discussed below. It should be noted that when a report is merged with an existing report, an operator may manually review and undo the merger if incorrectly merged by the safety analysis engine 120. Further, the report and existing incident may be placed on a list (e.g., a "black list") which would prevent future attempts by the safety analysis engine 120 to merge the report and the existing incident.

In an alternative embodiment, each event included within an incident may be assigned a category and a weight based on the event's category. In such an embodiment, the location-score may be generated based on the weight of each event.

In addition, a report or raw data received by the safety analysis engine 120 may include descriptions of one or more events. The description of the events may include "indications" as opposed to explicit recitations of the events. As one illustrative example, a tweet may read, "Smoke at 166 Main St." Although this tweet likely refers to a fire, the term "fire" is not explicitly recited. Therefore, a rules-based analysis and/or a machine-learning analysis may be implemented by the incident determination logic 124 to parse the data included in a report (e.g., text, audio, one or more images, etc.), determine whether the report includes one or more indications and determine the meaning of the indications. Upon determining the meaning of the indications, the incident determination logic 124 may use the indications to categorize an incident and/or event corresponding to the report.

Further, a report or raw data may include information such as location information (e.g., a GPS position, an address, a city, a state, a country, etc.), temporal information (e.g., day of the week, time of day, week number, month, season, etc.), weather information (e.g., temperature, precipitation, humidity, daylight, sight conditions, moon phase, etc.), venue information (e.g., whether any sporting or entertainment venues are nearby, etc.), event information (e.g., whether any sporting or entertainment events such as soccer matches or concerts are occurring nearby), etc. Such information, which may be referred to as "conditional tags," may be added to metadata or other information corresponding to an incident and/or event by the incident determination logic 124. The conditional tags may also be utilized by the location-score generation logic 125 to, for example, influence the weight assigned to a particular incident and/or event (e.g., additional weight may be added to a category of weather when the location-of-interest, as defined below, is experiencing an ice storm as opposed to sunny weather, wherein a greater weight results in a higher summation of all incidents and/or events accounted for in the location-score generation, thus indicating a lower level of safety). Additionally, conditional tags may also be used to determine patterns of incident triggers, which may be used for pattern prediction. As an illustrative example, in the German city of Munich, car accidents may be determined to correlate with a specific type of wind/pressure conditions, which may be determined (e.g., via a pattern) to be related to headaches many people suffer from in during such wind/pressure conditions (information relating to the wind/pressure conditions may be included within a conditional tag). In such an example, the conditional tag including the wind/pressure conditions, when viewed by the pattern detection logic 129, discussed below, may be determined to be at least part of a pattern that of a condition that triggers a type of incident (e.g., car accidents).

The location-score generation logic 125 may include functionality that, when executed by one or more processors, may cause the performance of operations that generate a location-score (e.g., generate a new location-score and/or supplement/update a location-score for a specified location) or generate multiple location-scores. The generation or supplementing/updating of a location-score may include obtaining a specified location, which may be determined via parsing information corresponding to an incident, parsing a specific request for a location-score that includes the current location, or an intended destination, of the requesting source, a specific request for a location-score that includes the current location or of an intended destination of a source other than the requesting source (e.g., a request for the location-score of a child, friend or employee), etc. The location of a source may be dynamic (e.g., a user or object that may relocate) or may be static and predefined (e.g., an asset such as a house, or a stationary electronic device placed in a storage unit for example).

The location-score of a specified location (this location referred to hereinafter as a "location-of-interest" or "LOI") may be based on information corresponding to one or more incidents each having a location within a predefined distance range from the LOI (e.g., a narrow-range location or broad-range location). In one embodiment, each type of incident may have a predefined range such that an incident of that incident type will factor into a location-score of a LOI when the LOI and the incident are within the predefined range. The information may be stored within the safety analysis engine 120. Multiple location-scores may be generated (e.g., location-scores based on different distance ranges or areas encompassing a user's location, such as neighborhood, city, country, narrow-range location, broad-range location, etc., scores), and discussions herein of generating a location-score encompasses generating multiple location-scores, even if the singular form "location-score" is used. The location-score generation logic 125 may determine all incidents that are located within the predefined distance range of the LOI and analyzes information corresponding to the determined incidents based on a set of predetermined rules (e.g., based on a first weighting system wherein a first weight is assigned to each category and/or level within a category).

Based on such analysis, the location-score generation logic 125 generates a location-score(s) for the LOI. In one embodiment, a location-score may be a representation of the sum of the weighted value for each incident. The representation may be a visual identifier such as a number, or a location safety level from a group of predefined safety levels (e.g., "safe," "neutral," "danger," etc.), or a color representation that indicates the location safety level. The first weighting system may be a plurality of predefined weights, where a weight is an indication of the level of impact an incident within the category/level should have on the location-score. Local response times of police, fire departments, other services, etc., may also be factored into a location-score.

In one embodiment, a second weighting system may be applied to each incident wherein the second weighting system may account for the timing of each incident. The second weighting system may be dynamic such that the values of the second weights change over time (i.e., the level of impact of an incident will decrease over time—an "impact decay rate"). Additionally, the impact decay rate may vary for each category and/or level within each category such that that weights assigned to certain categories or levels within a category decay faster than others. Each generated location-score may be stored in the location-score database 134 with a corresponding time stamp. The stored location-scores may be used by the pattern detection logic 129 and the event prediction logic 130, as described below.

The safety-profile logic 126, when executed by one or more processors, may include functionality that may cause the performance of operations including determining whether a safety profile corresponding to the user or object for which the location-score was requested is stored within the safety analysis engine 120 (hereinafter referred to as "the user" for convenience), and application of the safety profile to the location-score to generate a customized location-score, if applicable. The application of the safety profile may be an additional layer of intelligence that is applied to the location-score to create a location-score that is customized to a safety profile of the user (hereinafter referred to as a "customized location-score"). Importantly, a safety profile may apply to an object or asset as one applies to a human user. For example, a 2016 BMW sedan may have a safety profile that differs from the safety profile of a 2001 Kia sedan (e.g., the safety profile of the BMW may result in a different weighting scheme for dangerous situations than the safety profile of the Kia). Furthermore, a safety profile may change over time, wherein the change may be manually adjusted by a user and/or automatically adjusted at periodic time intervals (e.g., every 5 years the safety profile may be automatically adjusted to give higher weight to incidents and/or events corresponding to personal threats due to an increase in age).

In one embodiment, the application of the safety profile may include adjusting the weights of the location-score based on the safety profile contents according to a rules-based system. For example, the calculation of the location-score may be adjusted to provide additional weight to an incidents related to sexual harassment due to the user's gender. In a second example, added weight may be placed on all incidents involving crimes to the user's person—if applicable—because of the user's race or ethnicity, etc. Additionally, weight may be added to one or more incidents based on any characteristic of a user including, but not limited or restricted to, gender, height, weight, race/ethnicity, religious views, resident city, personal income, and/or past experiences (e.g., previously a victim of a crime). The additional weight (or in some instances, removal of weight) may be predefined for each safety profile. In one embodiment, the addition or removal of weight may be the same for all common characteristics.

In particular, there are at least three scenarios in which a safety profile may be applied to a location-score(s). A first scenario includes application of the safety profile to the location-score(s) by the safety profile logic 126 of the safety analysis engine 120. In the first scenario, the safety profile of the user may be stored by the safety analysis engine 120, e.g., in the safety profile database 135. The safety profile in the first scenario may include detailed information of the source and, if applicable, be stored as part of a user profile (e.g., a profile account of the user). When the safety profile is stored as part of the user profile, the user may connect to the safety analysis engine 120 from any electronic device (e.g., via an installed application 1012 or a website 1016 of FIG. 10).

A second scenario includes application of the safety profile to the location-score by the safety profile logic 126 of the safety analysis engine 120 with the safety profile being linked only to an electronic device, not a user profile (e.g., an anonymous identifier may be associated with the electronic device to provide the user of the electronic device privacy with such potentially sensitive data). In the second scenario, more anonymity may be maintained as a human user need not link a safety profile to himself or herself. Instead, the safety profile may only be identified by an electronic device identifier ("electronic device ID"). In contrast to the first scenario, the second scenario may not allow a human user to connect to the safety analysis engine from any electronic device and access his/her safety profile (e.g., instead, a separate, independent safety profile may be maintained for each device of the user).

A third scenario includes application of the safety profile to the location-score by the mobile application 1012 executing on an electronic device as illustrated in FIG. 10. In the third scenario, the safety analysis engine may have no knowledge of the user's safety profile. The safety profile may be stored directly on the user (or user's electronic device) and accessed only by the mobile application 1012 on the user (or user's electronic device). In this scenario, the location-score(s) of the LOI may be transmitted to the user and the user applies the safety profile; thus, complete anonymity may be maintained by the user.

The alert generation logic 127, when executed by one or more processors, may include functionality that causes the performance of operations including generation and transmission of alerts. As discussed above, alerts may be generated and transmitted in numerous situations. First, an alert may be generated and transmitted to a user requesting a location-score or a customized location-score (e.g., the location-score or customized location-score is below a safety threshold, which triggers the generation of an alert to vacate the area or take another action directed to ensuring the safety of the user). The generation of alerts may be triggered, for example, (i) when a user is in a predefined range of a location having a location-score below a safety threshold (generation of location-score may be triggered by an individual user, receipt of a report or raw data, periodically, etc.); (ii) when a user is within a predefined range of a social demonstration; (iii) when a user is within a predefined range of an incident having a large weight on the location-score generation, etc. Alerts may also be generated and transmitted to third-party software platforms or applications, such as WAZE, Apple® Maps, Google® Maps, or one or more autonomous vehicles, etc., for an overlay of the alert or data associated with the alert to a map based on a user's LOI. In one example, an alert may provide an indication to evacuate an area due to a specific incident/event that was detected there.

In one embodiment, instead of providing any location-score information based on crimes, alerts (along with corresponding data) may be generated and transmitted to third-party software platforms or applications for certain categories of incidents (e.g., natural disasters and fires). Additionally, alerts may be generated and transmitted to government officials or offices, local fire departments, local police forces, organizations, companies, etc.

The categorizing logic 128, when executed by one or more processors, may include functionality that causes the performance of operations including categorizing of incidents and storage of the incidents in a database (e.g., the incident database 133). In particular, the incidents stored in the incident database 133 are categorized, described and/or defined using a global notation. The global notation may be stored in a second catalog (which may be referred to as a "Super Cat") and/or the catalogs database 136. The Super Cat may include a standard definition and standard categorization for each incident type. Additionally, the global notation may include a plurality of levels within the standard categorization. In some embodiments, information pertaining to an event or incident may be received in an "external notation," which may refer to a notation used by, for example, (i) a specific geographic region (e.g., a broad-range location, a borough, a city, a town, etc.), (ii) a government entity, (iii) an organization (e.g., the Red Cross, the World Health Organization, etc.), and/or (iv) a political, economic and/or monetary union (e.g., the European Union). In one embodiment, a "single geographic region" utilizes a single notation (e.g., a manner of describing and categorizing incidents/events such as codes or labels). Thus, an external notation may refer to how a source or user of the system, e.g., in a single geographic region, describes, defines and/or classifies incidents or events. Specifically, a source or user in a first single geographic region may have an external notation that differs from an external notation of a source or user in a second single geographic region. When information pertaining to an incident or event is received by the safety analysis engine 120, the incident may be translated from the external notation (e.g., of the source from which the information was received) to the global notation and stored in the incident database 133 using the global notation. As mentioned above, the global notation is a notation used by the safety analysis engine 120 to categorize and store all incidents in a unified manner; thus, allowing for equalization between incidents originally received in differing external notations. It should be noted that an incident may be stored with some information pertaining to its original external notation. Additionally, the translations from each external notation to the global notation (and vice versa, from the global notation to each external notation) are stored in either the catalogs database 136 and/or the Super Cat. In one embodiment, the Super Cat may be included within the catalogs database 136 (e.g., as illustrated in FIG. 1). In a second embodiment, the Super Cat may be a database separate from the catalogs database 136. Further, descriptions, definitions and/or classifications pertaining to single geographic regions may also be stored in the catalogs database 136. Likewise, information regarding an incident received in an external notation of a first government entity, a first organization, and/or a first political, economic and/or monetary union will be translated to the global notation and stored in the incident database 133. Thus, incidents reported in any external notation may be equalized, compared and/or searched using the global notation.

As discussed above, information may be provided to the safety analysis engine 120 from a variety of sources, including municipalities, government offices (e.g., police departments, fire departments, etc.), wherein the information may include an external categorization provided by an authority or expert within the municipality, government office, etc. As mentioned above, the external categorization may be in a first notation that is particular to the corresponding location (or government entity, organization, and/or political, economic and/or monetary union).

For example, one or more single geographic regions may utilize differing external notations to describe the same type of event (e.g., a burglary). Continuing the example, the police department responsible for the London borough of Camden and the police department for the London borough of Westminster may each report the crime of burglary using different external notations. In particular, different categorizations or codes may be used on the police department records or between messages released to the public. Based on this example, information corresponding to incidents occurring in the London borough of Camden may be received by the safety analysis engine 120 in a first external notation and information corresponding to incidents occurring in the London borough of Westminster may be received by the safety analysis engine 120 in a second external notation, different than the first external notation. Thus, all incidents comprising events occurring in Camden and Westminster are stored in the incident database 133 in the global notation. The categorizing logic 128 may include the functionality to determine, and "learn" in some embodiments, each external notation and translate the external notation to the global notation so that all incidents may be stored using the global notation and categorized comparably. In one embodiment, the catalog generation logic 128 may use experiential knowledge and/or machine-learning logic to determine and learn each external notation, and subsequently, translate the external notation to the global notation. Alternatively, or in addition, the catalog generation logic 128 may receive manual updates pertaining to connections between indications and categories and/or use machine-algorithms to do so. An additional functionality of the categorizing logic 128 may be to translate the global notation to any external notation, which enables a first geographic region utilizing a first external notation to compare incidents occurring in the first geographic region with incidents occurring in a second geographic region that utilizes a second notation, different than the first notation.

The pattern detection logic 129, when executed by one or more processors, may include functionality that causes the performance of operations including analyzing data stored in one or more of the catalogs database 136, incident database 133 and location-score database 134. The analysis may be performed periodically or responsive to one or more predetermined triggering events. For example, the analysis may be performed at set time intervals, responsive to receiving a report, responsive to the generation of a new incident, responsive to the merging of a report with an existing incident, responsive to receiving a request for pattern detection from a user, etc. The pattern detection analysis may comprise a rules-based analysis that correlates the information corresponding a first set of one or more incidents stored in the incident database 133 with information stored in one or more of the incident database 133 (e.g., information corresponding to a second set of incidents), catalogs database 136 and the location-score database 134 to determine whether a pattern exists. The analysis may also include machine-learning algorithms.

In one embodiment, a pattern may be defined by a level of similarity above a predefined threshold based on a correlation between at least a first incident and information stored in one or more of the incident database 133, catalogs database 136, the location-score database 134 and the information layer database 138. The information layer database 138 may store information such demographic data, building types, time information, location information, etc. For example, a pattern may include a plurality of incidents of a same category occurring within a range of time within a particular geographic area. More specifically, a pattern may be, for example, a plurality of burglaries occurring within a geographic area of three blocks within a particular city during the hours of 5 pm-10 pm on Fridays. Thus, a pattern may include characteristics such as an incident category/level component, a location component, and a time component. Although, a pattern need not include all three.

A pattern may be time-based (e.g., a high number of crimes occur during the days immediately preceding a holiday), location-based (e.g., a high number of crimes occur within a particular geographical area of a city), event-based (e.g., a high number of crimes occur in cities that host World Cup games), or incident-based (e.g., a first crime is often followed by a second crime).

Additionally, an analysis of incidents received from sources within a predefined region (e.g., a single geographic region as used above) may correspond to pattern detection at a lower level, specific to the single geographic region. Additionally, because all incidents are stored in a global notation, an analysis may be performed at a global level such that patterns may be detected for a plurality of single geographic regions (e.g., across the entire Europe Union, across an entire continent, across the world, etc.) All detected patterns may be stored in the pattern database 137.

The event prediction logic 130, when executed by one or more processors, may include functionality that causes the performance of operations including correlation of one or more incidents (e.g., information corresponding to one or more incidents comprising events that occurred within a predefined time frame of the current time, for example, any incident within the past week, any incident within the past day, any currently on-going incident, etc.) with one or more patterns. The event prediction logic 130 performs an analysis to determine whether one or more incidents has at least a predetermined threshold of similarity with one or more characteristics of a pattern such as an incident category component, a location component, and a time component. For example, the event prediction logic 130 may perform an event prediction analysis using information corresponding to an incident, the information generated by the safety analysis engine 120 within a day of the current time, wherein the incident ("incident_1") is a burglary at an address within a specific geographic area of a particular city. Upon analyzing one or more patterns, the event prediction logic 130 may determine there is a correlation above a predetermined similarity threshold between incident_1 and a pattern involving burglaries within the specific geographic area in which the burglary occurred. Upon determining a correlation above the predetermined threshold exists, the event prediction logic 130 then may determine which portion or portions of the pattern have not yet occurred (or have not yet been reported to the safety analysis engine 120) based on the information corresponding to the incident and predicts one or more events that are likely to occur in the future (e.g., one or more events included in the pattern that have not yet occurred). The prediction of an event may enable the event prediction logic 120 to generate a predictive location risk score (i.e., similar to a location-score discussed above), which provides a predictive indication of a location-score for a specified location in the future.

The event prediction logic 130 may be used to trigger the generation and transmission of alerts to users located in a predefined range of a predicted event, users that may be sensitive to the predicted event (e.g., an incident corresponding to the event may be included within the user's safety profile as having a significant impact on a customized location-score), users or others listed on a predefined list of a user that is located in a predefined range of a predicted incident or sensitive to the predicted incident (e.g., a "favorites" list that may include family, friends, an employer, etc.). Alerts may also be transmitted to local municipalities, governments, fire and police departments, third-party software platforms or applications, etc.

Furthermore, the predicted events may be stored in the incident database 133 and then compared against incidents that were actually generated by the safety analysis engine 120. The comparison between the predicted events and the incidents actually generated by the safety analysis engine 120 may be used by the machine-learning logic of the pattern detection logic 129 to improve the pattern detection analysis and event prediction process.

The user-location tracking logic 131, when executed by one or more processors, may include functionality that causes the performance of operations including assigning an identifier to an electronic device or object and monitoring the movements of the electronic device or object based on data collected from sensors of, or coupled to, the electronic device, object, or asset. For example, an electronic device may include sensors such as, inter alia, an accelerometer and/or gyroscope, which may collect data at periodic intervals, at all times, or upon certain triggers. Alternatively, or in addition, the electronic device or object may be coupled to sensors that collect data in a similar manner as those included within an electronic device, object, or asset. For example, a GPS device may be coupled to a bicycle and collect data in the same or similar manner as a GPS device included within an electronic device. For one or more sensors included in, or coupled to, an electronic device, object, or asset, a threshold may be predetermined for data collected by the sensor, such that movements that result in the collection of data exceeding the applicable predetermined threshold cause the user-location tracking logic 131 to transmit the location of the electronic device or object to the safety analysis engine. In one embodiment, the user-location tracking logic 131 may obtain the location of the electronic device or object by querying the location services of the electronic device or object. The user-location tracking logic 131 may not be used with an asset, for example, a home, as the asset may be a permanent structure. However, it is noted that the location of an asset that is stationary may be manually entered into the safety analysis engine 120 in order to generate a location-score for the asset.

Additionally, when data collected by the sensor does not exceed the applicable predetermined threshold for the sensor, the user-location tracking logic 131 may determine whether a predetermined amount of time has passed since the last transmission of the location of the electronic device or object. When at least the predetermined amount of time has passed since the last transmission, the user-location tracking logic 131 may transmit the location of the electronic device or object to the safety analysis engine. The receipt of the location of the electronic device or object by the safety analysis engine may act as a trigger for the location-score generation logic 125 to begin a location-score generation process for the received location, which may subsequently be transmitted to the electronic device or object.

Referring now to the recipients of the generated alerts, the information providers may receive the alerts thereby forming a feedback loop in the system 100. Specifically, a user may request the safety analysis engine 120 generate or update a location-score, or customized location-score, for the current location of the user. Upon generating/updating the location-score, or customized location-score, the safety analysis engine 120 may transmit an alert providing the user with the location-score, or customized location-score and, optionally, or more behavioral advice or warnings (e.g., "do not walk outside alone," "head south on main street to leave the area safely," etc.). Additionally, the behavioral warnings may be directed as specific actions that may be taken by an object (e.g., a smart car may roll up windows, close a sun roof, lock the car doors, etc.). The system 100 and engine 120 may know or have access to safety information, (e.g., locations/phone numbers of police stations and fire stations, locations of defibrillators, fire extinguishers, other safety materials, etc.) and may be able to include such information in alerts, notifications, or behavioral advice/warnings. Additionally, the recipients of alerts may be family, friends, employers, etc., associated with a user that requested the generation of the location-score (e.g., to notify the friends, family, employer, etc., that the user is in a location having a location-score indicating a dangerous situation). Furthermore, in one embodiment, family, friends, employer, etc., may request to have a location-score, or customized location-score, generated for a user (e.g., this may require the permission of the user).

Further, alerts may be provided to social media via one or more available platforms such as, but not limited or restricted to, Twitter, Instagram, Facebook, any news application, etc. In this situation, location-scores (as opposed to customized location-scores) may be provided, possibly in the case of a major event (e.g., murder, a bank robbery with hostages, a flood, a fire, etc.). Additionally, alerts may be provided to authorities and governments, such as local police departments, fire stations, first responder stations, governors' offices, government agency offices, etc.

It has been contemplated that alerts may also be integrated into third-party software platforms or applications such as Uber®, Lyft®, WAZE®, Apple® Maps, Google® Maps, etc. For example, these software platforms or applications may be able to take into account additional information from system 100 in performing their operations, e.g., to guide users away from dangerous areas or situations or keep them from entering unsafe areas. Optionally, the system 100 could itself provide navigation or other services similar to those third party platforms or applications, and would differ in that it provides much more comprehensive safety information and guidance. Similar to alerts provided to social media, alerts provided to third-party software platforms or applications may, optionally, be limited to location-scores as opposed to customized location-scores or may only provide notifications of particular categories of incidents (e.g., natural disasters, car accidents, fires, etc.).

III. Logic Methodology

Figure 2:
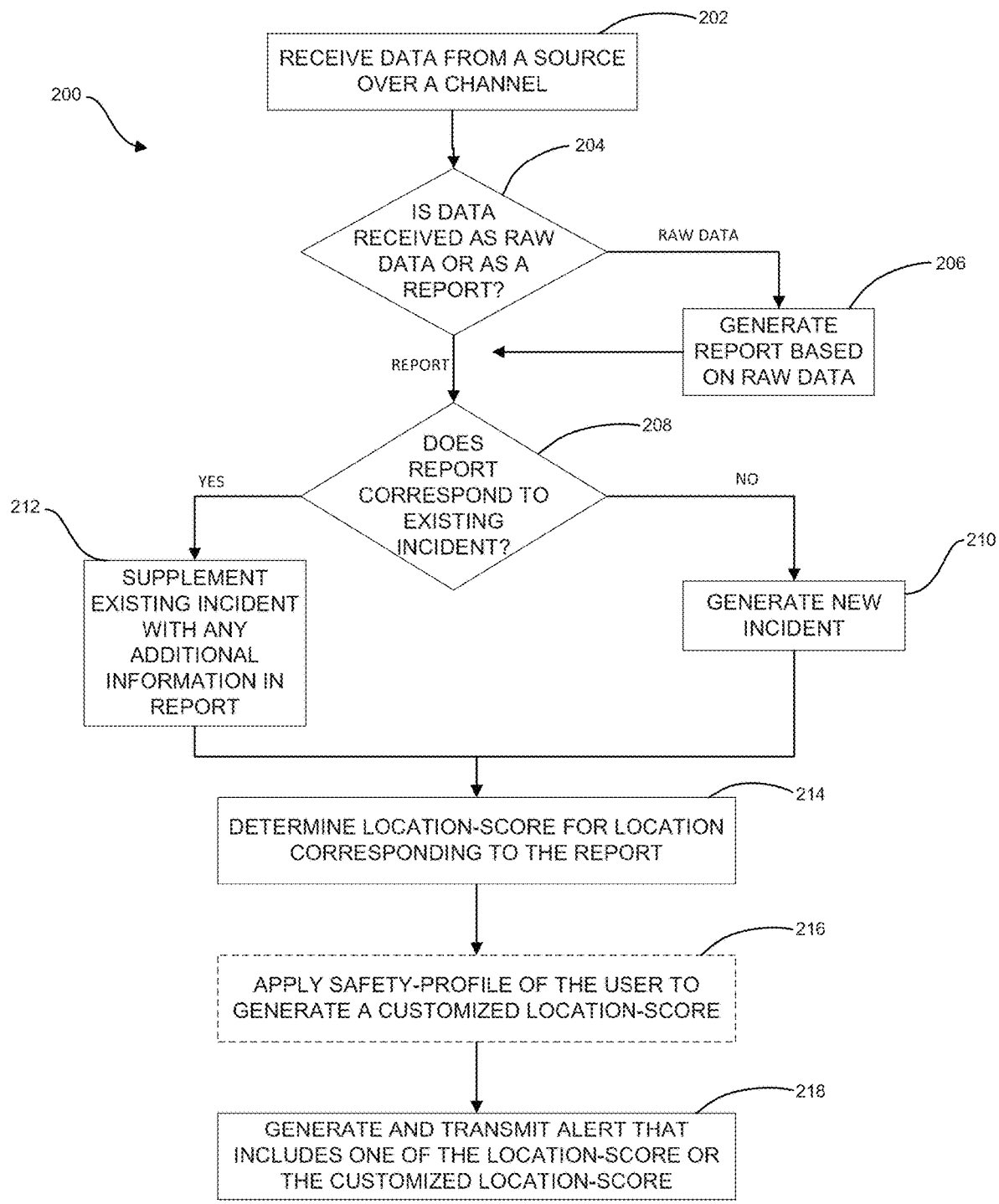
FIG. 2 shows flowchart illustrating an exemplary method for receiving data detailing how an incident and/or event may be collected from one or more sources and generating a location-score for a location corresponding to the incident and/or event detailed in the received data with an exemplary safety analysis engine (e.g., engine 120 shown in FIG. 1).

Referring now to FIG. 2, a flowchart illustrating an exemplary method for receiving data detailing an event collected by one or more sources and generating a location-score for a location corresponding to the event detailed in the received data with the safety analysis engine 120 of FIG. 1 is shown. Each block illustrated in FIG. 2 represents an operation that may be performed in the method 200 of receiving data from one or more sources, generating a location-score corresponding to a location associated with the received data, optionally generating a customized location-score based on a user (e.g., customized location-score customized based on user's safety profile) and transmitting an alert or notification to the user—when applicable—which provides the location-score or the customized location-score. Referring to FIG. 2, at block 202, the safety analysis engine 120 may receive data via the communication logic 121 from a source over a channel.

At block 204, the logic of the safety analysis engine 120 may determine whether the data is received as raw data or in the form of a report. When the data is received as raw data, the report generation logic 122 may generate a report from the received raw data (block 206). The method 200 may then proceed to block 208. When the data is received in the form of a report, the method 200 may proceed to block 208.

At block 208, the incident determination logic 124 may determine whether the report corresponds to an existing incident stored within the safety analysis engine 120. When the report is determined to correspond to an existing report (yes at block 208), the incident determination logic 124 may supplement the existing incident with any additional information present in the report that was not previously present in the existing incident (block 212). The method 200 may then proceed to block 214. When the report is determined not to correspond to an existing report (no at block 208), the incident determination logic 124 may generate a new incident using the information in the report and store the incident in the incident database 132 (block 210). The method 200 may then proceed to block 214.

At block 214, the location-score generation logic 125 may generate a location-score for the location corresponding to an event detailed in the report. Optionally, at block 216, the safety profile logic 126 may apply a safety profile of a user, if applicable as discussed above, to the location-score to generate a customized location-score. At block 218, the alert generation logic 127 may generate and transmit—via the communication logic 121—an alert or notification that includes at least one of the location-score and/or the customized location-score to the user or others as discussed above. The location-score, the customized location-score, if applicable, and the alert or notification may be stored in one or more databases within the safety analysis engine 120.

Figure 3:
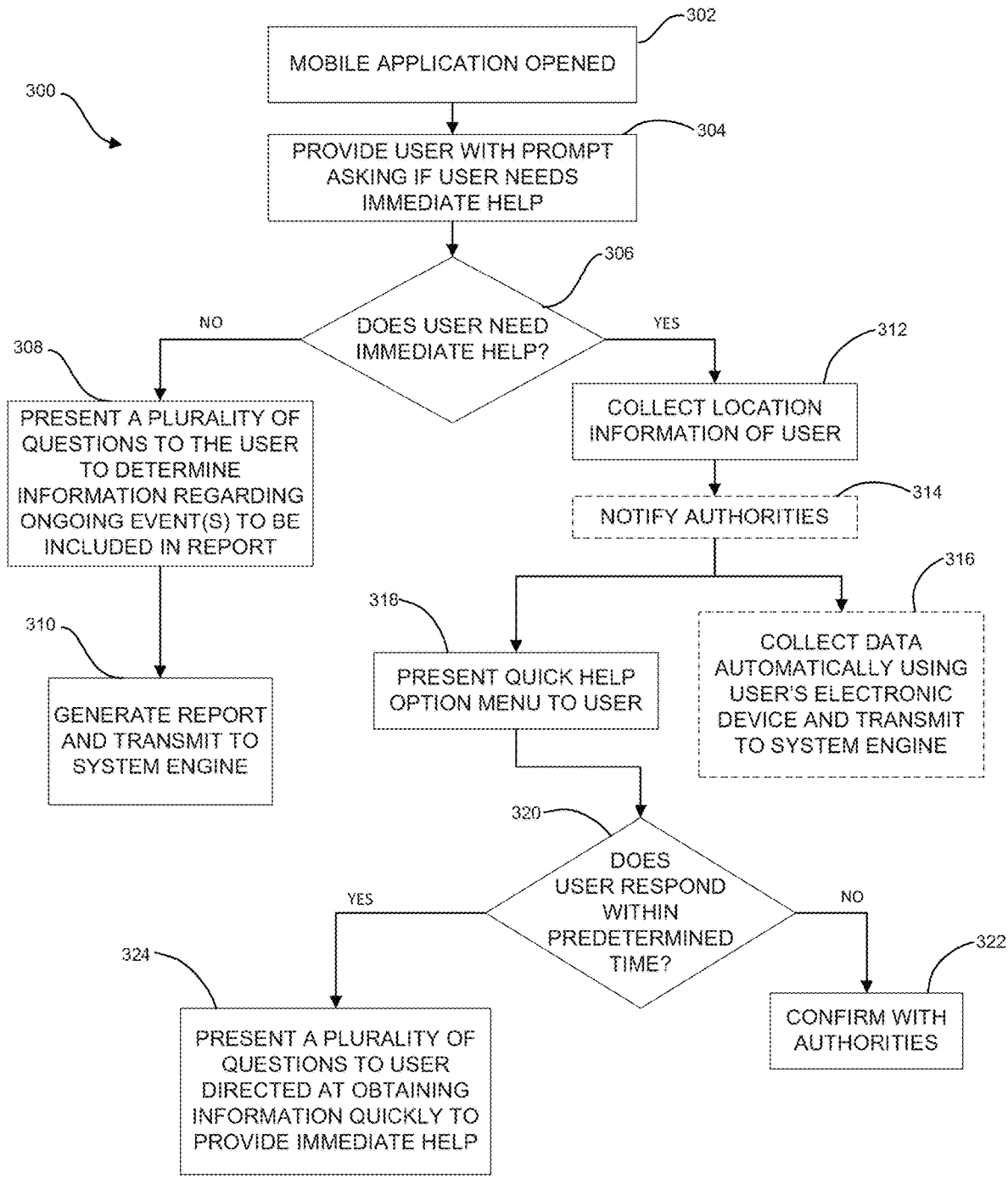
FIG. 3 shows a flowchart illustrating an exemplary method for collecting data via an exemplary mobile application (e.g., mobile application 1012 shown in FIG. 10) and generating a report with a safety analysis engine (e.g., engine 120 shown in FIG. 1).

FIG. 3 shows a flowchart illustrating an exemplary method for collecting data via a mobile application 1012 of FIG. 10 and generating a report with an engine (e.g., the safety analysis engine 120 of FIG. 1). Each block illustrated in FIG. 3 represents an operation that may be performed in the method 300 of collecting data via a mobile application 1012 of FIG. 10 and generating a report within the safety analysis engine 120. Referring to FIG. 3, at block 302, the mobile application 1012 is opened on an electronic device. At block 304, the mobile application 1012 provides the user of the electronic device with a prompt asking if the user needs immediate help. At block 306, responsive to the input received from the user, the mobile application 1012 may determine whether the user needs immediate help. When the user does not need immediate help (no at block 306), the mobile application 1012 presents the user with a plurality of questions in a guided manner to aid the user in providing details about one or more events that will be provided to the safety analysis engine 120 (e.g., the mobile application 1012 may utilize a decision-tree system using the user's input to dictate the path along the decision-tree, e.g., via a bot chat system that may utilize a predefined rule set and/or artificial intelligence/machine learning techniques) (block 308). In one embodiment, the plurality of questions presented to the user may include a request for the user to input an approximate distance between the user and the location of an event. For instance, a user may be standing across the street from a store in which a burglary took place, and in order to report the proper address, the user may be asked to approximate the distance between the user and the location of the burglary. The location may be measured in various formats such as feet, meters, city blocks, or predefined informal terms such "across the street." Additionally, the mobile application 1012 may display a sliding scale that enables the user to approximate the distance. Further, the user may be able to enter the height at which an event occurred or is occurring (e.g., smoke coming from a first floor window or a fifth floor window). In one embodiment, one or more sensors may be calibrated according to the angle of the electronic device. For example, a mobile phone may be calibrated at a "neutral" or "base" angle when the screen of the mobile phone (e.g., an Apple iPhone or a Samsung Galaxy) is perpendicular to a flat ground surface and may determine the height of an event or location based on the angle of the mobile phone relative to the calibrated ground when an image of the event or location is taken and the user inputs an approximate distance from the event or location of the event. The input received from the user may be used to generate a report that details the event that caused the user to open the mobile application 1012. At block 310, the mobile application 1012 may generate and transmit a report to the safety analysis engine 120.

When the user does need immediate help (yes at block 306), the mobile application 1012 may collect the location information of the electronic device and transmit the location to the safety analysis engine 120 (block 312). Optionally, at block 314, the mobile application 1012 (or the safety analysis engine 120) may notify authorities such as a police department, paramedics, or fire department of a person in need of help at the location extracted from the electronic device. If average response times are known/stored, the system may provide updates/notices to the user regarding how long before police, ambulance, fire, etc., may or are likely to arrive. Optionally, at block 316, the mobile application 1012 may automatically collect data using the electronic device and transmit the collected data to the safety analysis engine 120. For example, the mobile application 1012 may collect images, video or sounds using a camera or microphone of the electronic device. At block 318, which, in one embodiment, occurs concurrently in time (e.g., at least overlapping in time) with the operations of block 316, the mobile application 1012 presents the user with a quick help menu (e.g., options to dial 911, send an ambulance, send the police, etc.). The quick help menu may include options that require minimal effort in case the mobile application 1012 is difficult for the user to operate, the user is severely wounded, etc. At block 320, the mobile application 1012 may determine whether the user has responded within a predetermined time. For example, one object of the quick help menu is to provide help as quickly possible; therefore, when the user fails to respond within a predetermined time, the mobile application 1012 may assume the user is no longer able to respond. When the user has not responded within the predetermined time (no at block 320), the mobile application 1012 (or the safety analysis engine 120) follows up with the authorities (or contacts the authorities if such was not done at optional block 316).

When the user has responded within the predetermined amount of time (yes at block 320), the mobile application 1012 presents the user with a plurality of questions directed at obtaining information quickly to provide immediate help that is relevant to the user's needs. The plurality of questions may be the same as or differ from those presented to the user in block 308.

Figure 4:
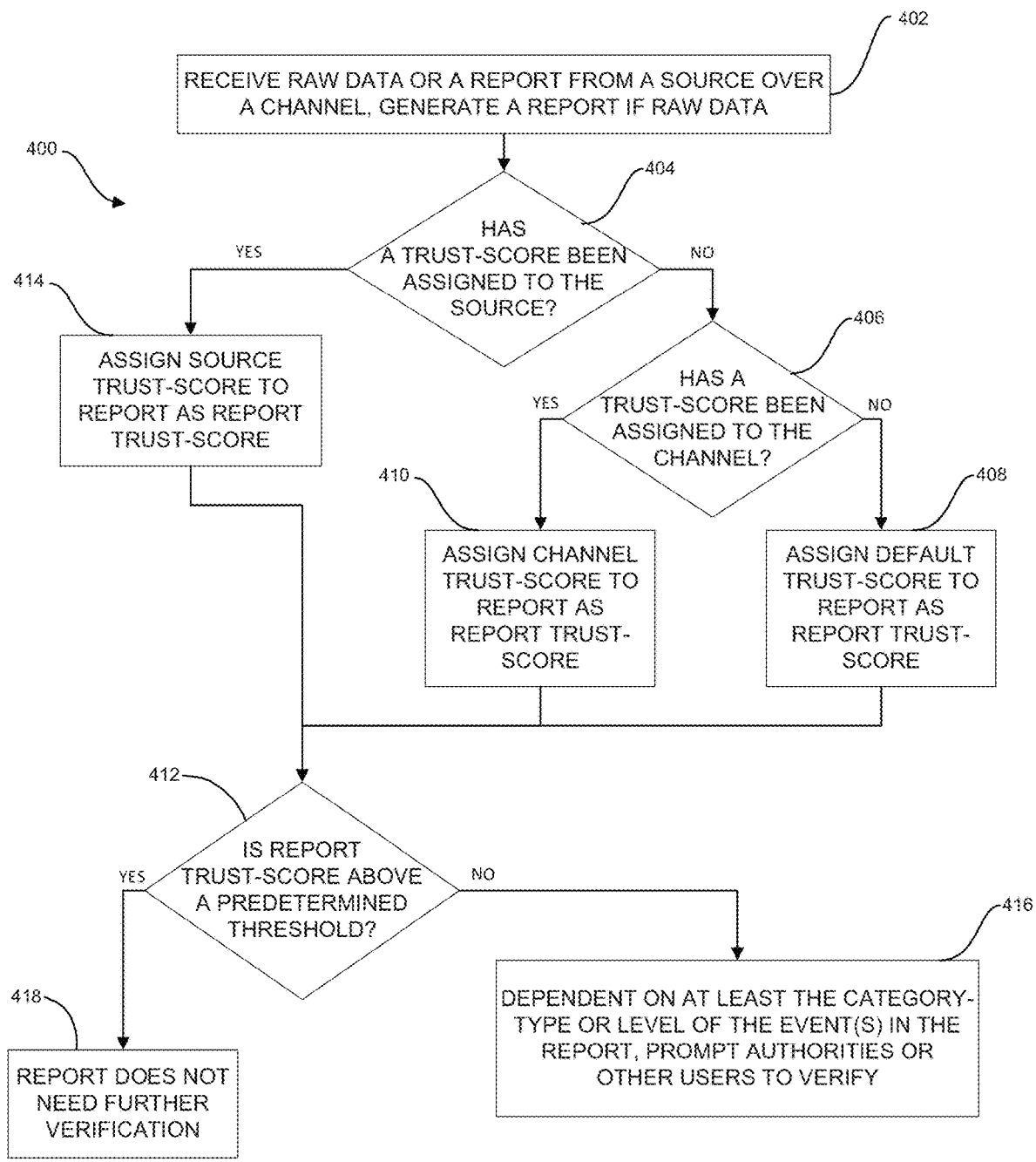
FIG. 4 shows a flowchart illustrating an exemplary method for evaluating whether received data needs to be verified prior to generating an incident corresponding to the report or supplementing an existing incident with the report using a safety analysis engine (e.g., engine 120 shown in FIG. 1).

Referring to FIG. 4, a flowchart illustrating an exemplary method for evaluating whether received data needs to be verified prior to generating an incident corresponding to the report or supplementing an existing incident with the report using the safety analysis engine 120 of FIG. 1 is shown. Each block illustrated in FIG. 4 represents an operation that may be performed in the method 400 of evaluating whether received data to be verified prior to be utilized by the safety analysis engine 120. Referring to FIG. 4, at block 402, the safety analysis engine 120 receives raw data or a report from a source over a channel. As discussed above, the safety analysis engine 120 may generate a report, if raw data is received. At block 404, the safety analysis engine 120 may determine whether a trust-score has been assigned to the source. When a trust-score has been assigned to the source (yes at block 404), the trust-score of the source may be assigned to the report as the report trust-score (RTS). When a trust-score has not been assigned to the source (no at block 404), the safety analysis engine 120 may determine whether a trust-score has been assigned to the channel (block 406). When a trust-score has been assigned to the channel (yes at block 406), the trust-score of the channel may be assigned to be the RTS (block 410). When a trust-score has not been assigned to the channel (no at block 406), a default trust-score may be assigned to be the RTS (block 408).

At block 412, the safety analysis engine 120 may determine whether the RTS is above a predetermined threshold. When the RTS is not above a predetermined threshold (no at block 412), dependent on at least the category or level of one or more event(s) detailed in the report, the safety analysis engine 120 may prompt authorities or other users to verify the one or more event(s) detailed in the report (block 416). When the RTS is above a predetermined threshold (yes at block 412), the safety analysis engine 120 may determine the report needs to further verification and may be provided to the incident determination logic (block 418).

Figure 5:
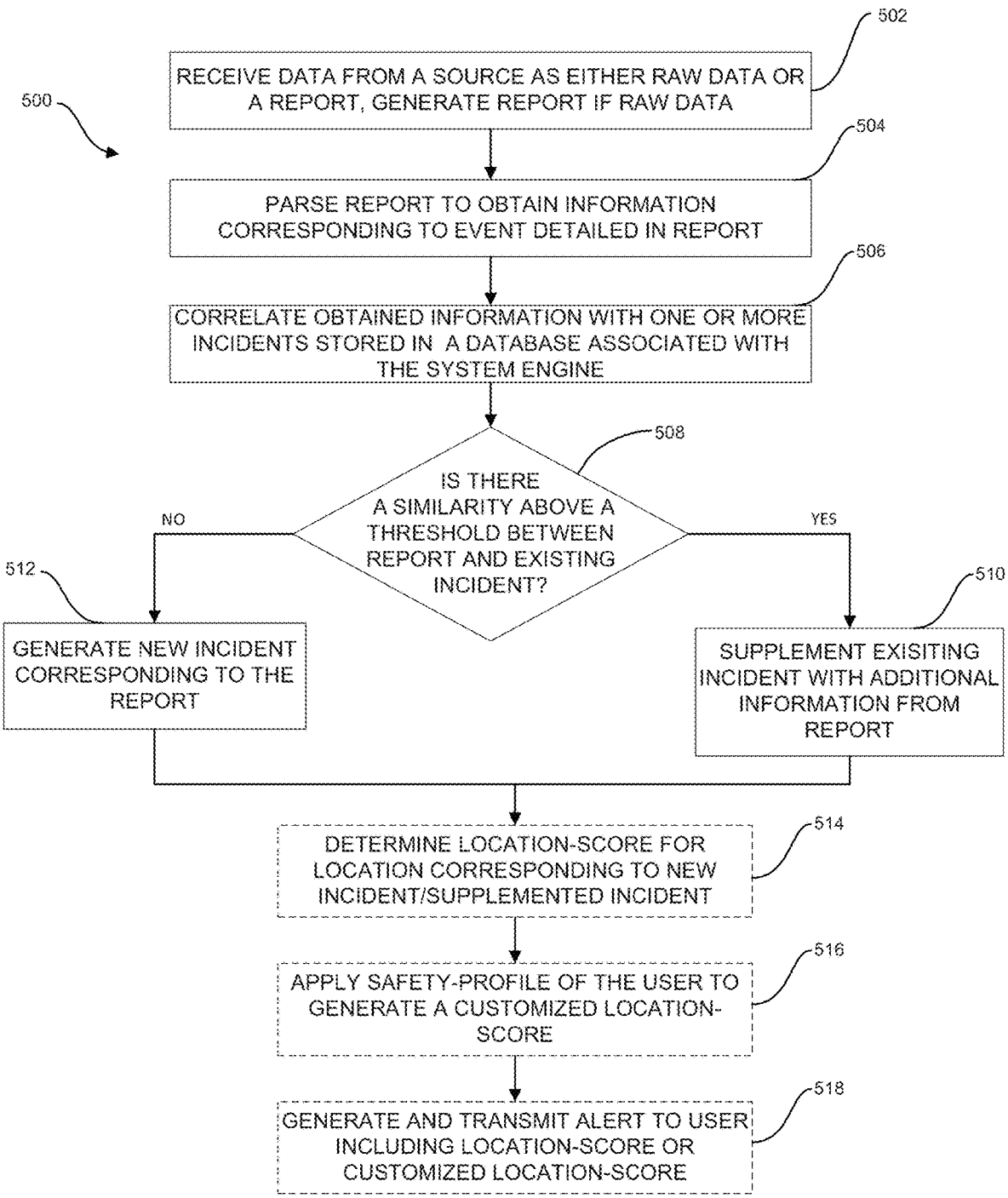
FIG. 5 shows a flowchart illustrating an exemplary method for determining whether a report corresponds to an existing incident and generating a location-score based on a supplemented existing incident or a new incident corresponding to the report using a safety analysis engine (e.g., engine 120 shown in FIG. 1).

Referring to FIG. 5, a flowchart illustrating an exemplary method for determining whether a report corresponds to an existing incident and generating a location-score based on a supplemented existing incident or a new incident corresponding to the report using the safety analysis engine 120 of FIG. 1 is shown. Each block illustrated in FIG. 5 represents an operation that may be performed in the method 500 of determining whether a report corresponds to an existing incident stored within the safety analysis engine 120. Referring to FIG. 5, at block 502, the safety analysis engine 120 receives raw data or a report from a source over a channel. As discussed above, the safety analysis engine 120 may generate a report if raw data is received. At block 504, the safety analysis engine 120 may obtain information corresponding to the one or more events detailed in the report by parsing the report. At block 506, the safety analysis engine 120 may correlate the information obtained via parsing the report with one or more incidents stored in the safety analysis engine 120, e.g., in the incident database 133.

At block 508, the safety analysis engine 120 may determine whether there is a similarity above a predetermined threshold between the report and an existing incident. When a similarity above the predetermined threshold exists (yes at block 508), the existing incident may be supplemented with information included in the report that was not included in the existing incident (block 510). If there is no new information, the incident may not be supplemented, the additional report may merely be used for additional confirmation, or the report may merely be linked to the incident. In one embodiment, although not supplemented, a report generated via information from a second source having a higher trust score than a first source that initially provided information on the incident may increase the trust score associated with the report/incident. When a similarity above the predetermined threshold was not found (no at block 508), a new incident may be generated based on the information set forth in the report (block 512).

Optionally, at block 514, the safety analysis engine 120 may determine a LOI for a user corresponding to the new incident or the supplemented incident. Further, optionally, at block 516, the safety analysis engine 120 may apply a safety profile corresponding to the user to generate a customized location-score for the user. Subsequently, at block 518, the safety analysis engine 120 may generate and transmit an alert or notification to the user (e.g., a user that provided the raw data or report, a user that has a current known location within a predetermined range of the LOI, authorities, etc.) wherein the alert or notification may include the location-score or the customized location-score as well as one or more behavioral suggestions (e.g., "beware of pick-pockets").

Figure 6:
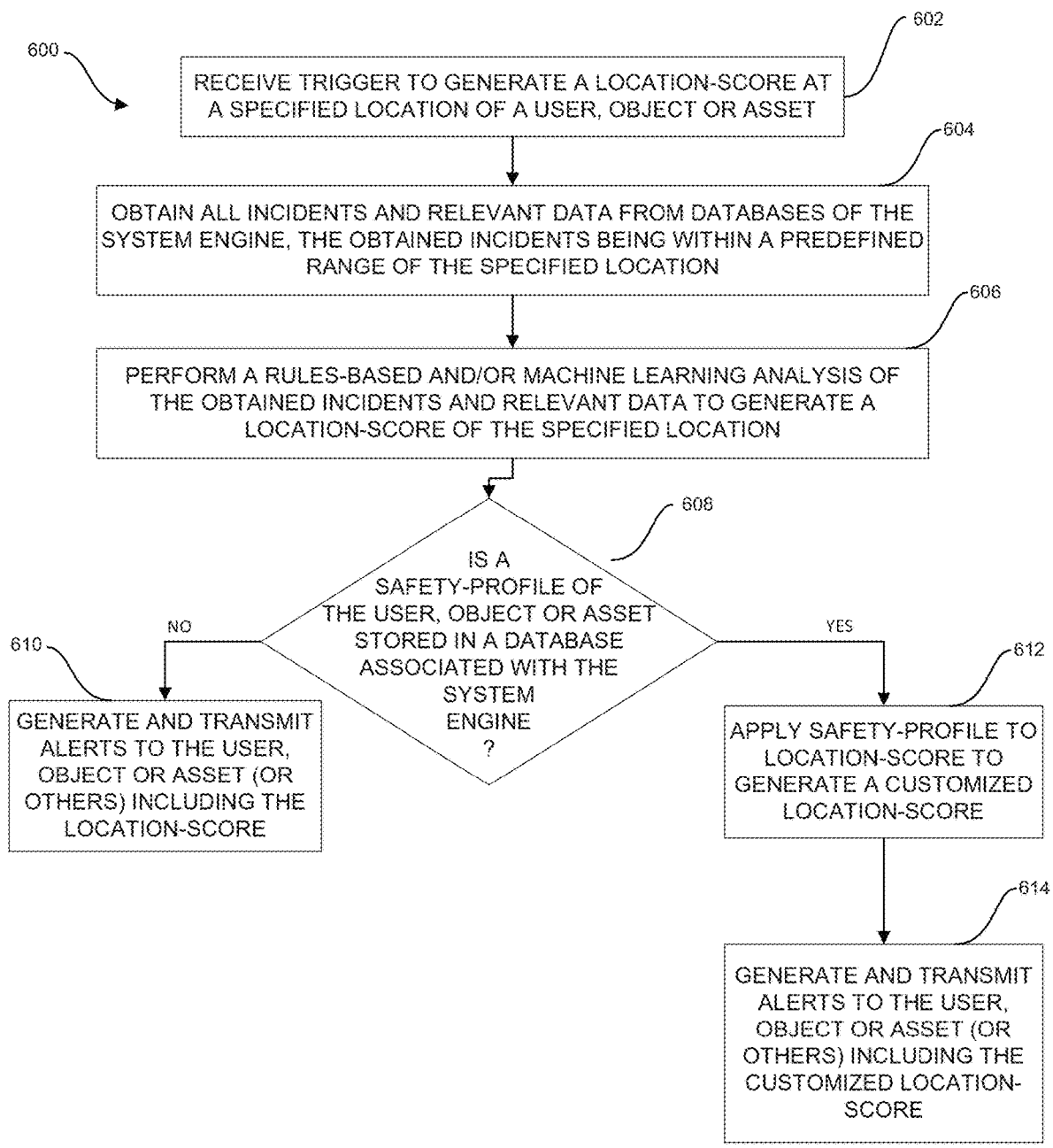
FIG. 6 shows a flowchart illustrating an exemplary method for generating a location-score and optionally a customized location-score based on using a safety analysis engine (e.g., engine 120 shown in FIG. 1).

Referring to FIG. 6, a flowchart illustrating an exemplary method for generating a location-score and optionally a customized location-score based using the safety analysis engine 120 of FIG. 1 is shown. Each block illustrated in FIG. 6 represents an operation that may be performed in the method 600 of location-score and optionally a customized location-score. Referring to FIG. 6, at block 602, the safety analysis engine 120 may receive a trigger to generate a location-score (which may include supplementing or updating a previous location-score) at a specified location of a user (e.g., a user, an object or an asset), wherein the trigger may include at least the specified location (e.g., the LOI). At block 604, the safety analysis engine 120 may determine all incidents that include events within a predetermined range of the LOI and other relevant data (e.g., applicable patterns), from one or more databases of the safety analysis engine 120. At block 606, the safety analysis engine 120 may perform a rules-based and/or machine-learning analysis of the obtained incidents and relevant data to generate a location-score of the specified location.

At block 608, the safety analysis engine 120 may determine whether a safety profile of the user is stored in a database associated with the safety analysis engine 120, e.g., the safety profile database 135. As discussed above, the safety profile may be stored in the safety profile database 135 and linked to a user profile or an electronic device ID, or alternatively, stored on a mobile device and not in a database associated with the safety analysis engine 120. When the safety profile is not stored in the safety-profile database 135 (no at block 608), the safety analysis engine 120 may generate and transmit an alert or notification to the user and/or others that includes the location-score (block 610). When the safety profile is stored in the safety-profile database 135 (yes at block 608), the safety analysis engine 120 may apply the safety profile corresponding to the user to the location-score to generate a customized location-score (block 612). Subsequent to the generation of the customized location-score, the safety analysis engine 120 may generate and transmit an alert or notification to the user and/or others that includes the customized location-score (block 614).

Figure 7:
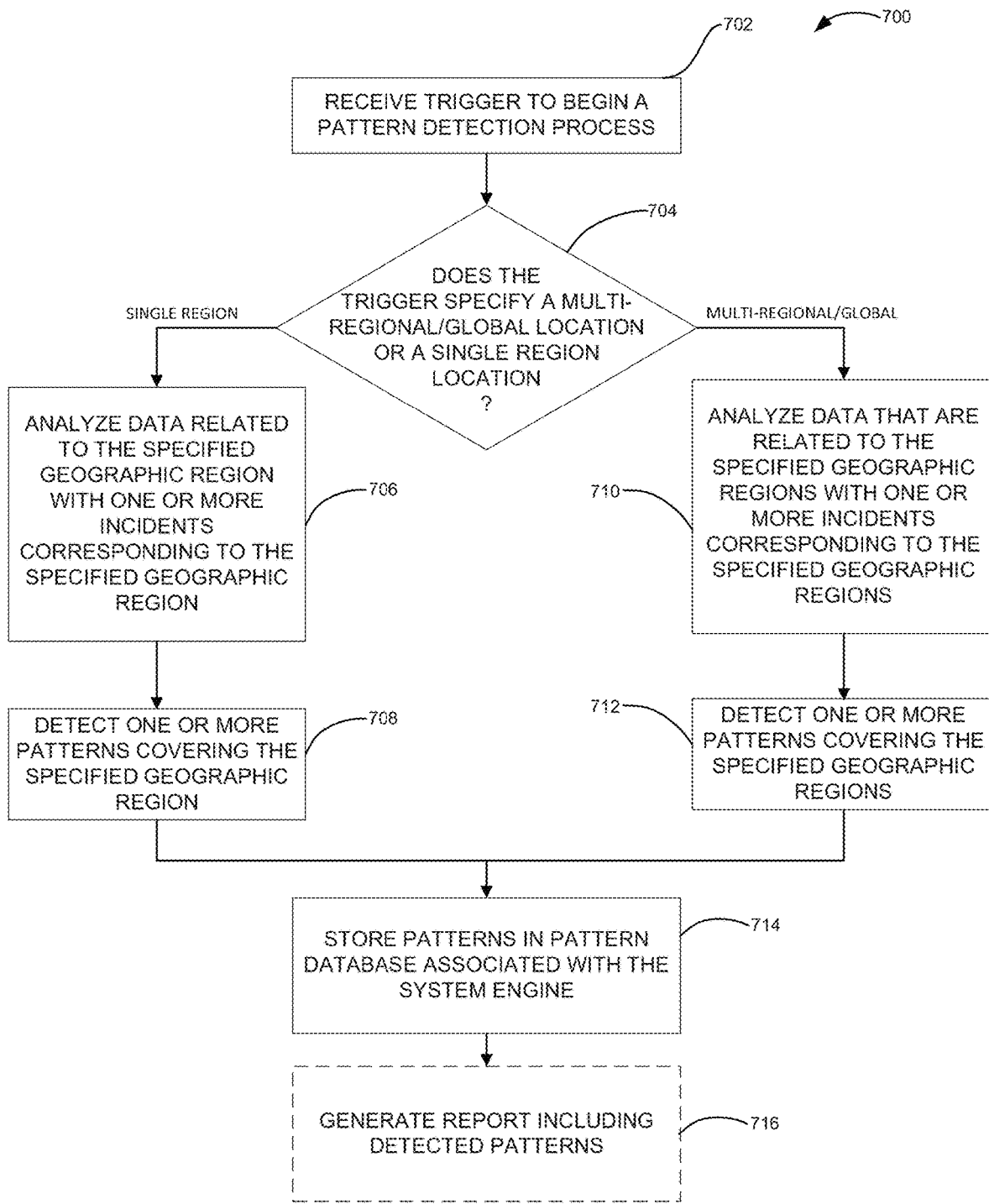
FIG. 7 is a flowchart illustrating an exemplary method for detecting a pattern associated with a trigger received by a safety analysis engine (e.g., engine 120 shown in FIG. 1).

Referring to FIG. 7, a flowchart illustrating an exemplary method for detecting a pattern associated with a trigger received by the safety analysis engine 120 of FIG. 1 is shown. Each block illustrated in FIG. 7 represents an operation that may be performed in the method 700 of detecting a pattern based on at least data stored within the safety analysis engine 120. Referring to FIG. 7, at block 702, the safety analysis engine 120 may receive a trigger to begin a pattern detection process. In one embodiment, a trigger may be a report, new incident, supplemented incident, request, etc. The location for which a pattern is to be determined may be specified in the report/incident or be a specified region or regions within a request. Additionally, the pattern detection process may be triggered periodically (e.g., at periodic time intervals) or aperiodically such that the pattern detection process is triggered for a specific region (e.g., a single region) or multiple regions (e.g., a multi-regional location). A region may be a broad-range location. A single region may refer to a city, borough within a city, a town, etc., that uses a single external notation for describing and reporting events. A multi-regional location may refer to a city, a state, a nation, multiple nations, etc., that use a plurality of external notations for describing and reporting events. However, it should be noted that the plurality of regions may all use the same notation for describing and reporting events and incidents.

At block 704, the safety analysis engine 120 may determine whether the trigger specifies a multi-regional/global location or a single region location. When the trigger specifies a single region, the safety analysis engine 120 may analyze data related to the specified geographic region with one or more incidents corresponding to the specified geographic region (block 706). In one embodiment, the analysis may utilize a rules-based analysis. In a second embodiment, the analysis may include a machine-learning analysis. In yet another embodiment, the analysis may include a combination of a rules-based analysis and a machine-learning analysis. At block 708, the safety analysis engine 120 may detect one or more patterns based on the analysis that cover the specified geographic region. Subsequent to block 708, the method 700 may proceed to block 714, discussed below.

When the trigger specifies a multi-region/global location, the safety analysis engine 120 may analyze data related to the specified geographic regions with one or more incidents corresponding to the specified geographic regions (block 710). As mentioned above, the analysis may be either or a combination of a rules-based analysis and a machine-learning analysis. At block 712, the safety analysis engine 120 may detect one or more patterns based on the analysis that cover the specified geographic regions. Subsequent to block 712, the method 700 may proceed to block 714 at which the safety analysis engine 120 may store the one or more detected patterns in the pattern database 137 associated with the safety analysis engine 120. Optionally, at block 716, the safety analysis engine 120 may generate a report including the detected patterns. In some embodiments, the detected patterns may be provided to a user in an external notation corresponding to the user's geographic location (or government affiliation, organizational affiliation, and/or political, economic or monetary union affiliation).

Figure 8:
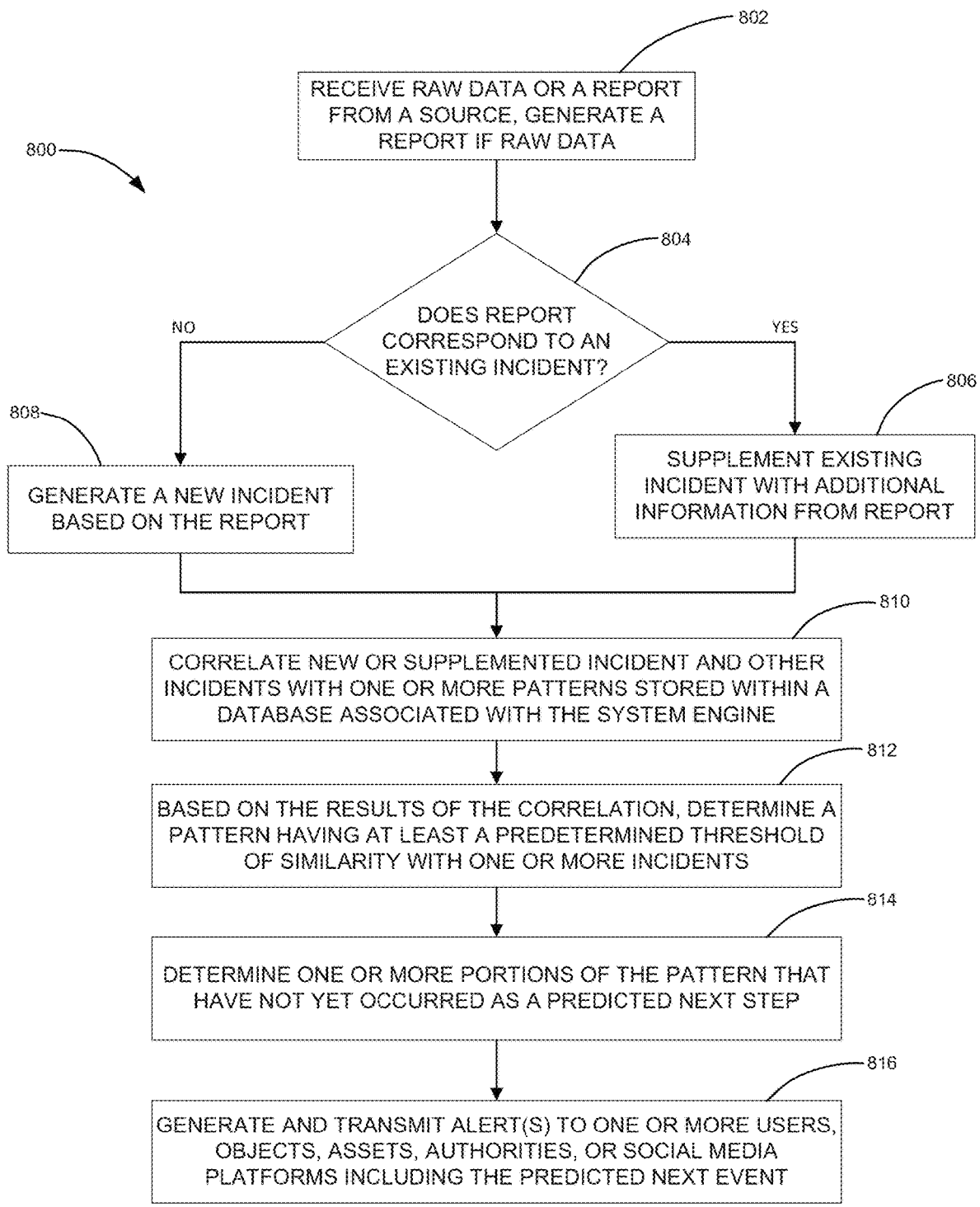
FIG. 8 is a flowchart illustrating an exemplary method for predicting an event using a safety analysis engine (e.g., engine 120 shown in FIG. 1).

Referring to FIG. 8, a flowchart illustrating an exemplary method for predicting an event using an engine (e.g., the safety analysis engine 120 of FIG. 1) is shown. Each block illustrated in FIG. 8 represents an operation that may be performed in the method 800 of predicting an event based on at least data stored within the safety analysis engine 120. Referring to FIG. 8, at block 802, the safety analysis engine 120 receives raw data or a report from a source over a channel. As discussed above, the safety analysis engine 120 may generate a report if raw data is received. At block 804, the safety analysis engine 120 may determine whether the report corresponds to an existing incident. When the report corresponds to an existing incident (yes at block 804), the safety analysis engine 120 may supplement information corresponding to the existing incident with additional information included in the report, as discussed above ("supplemented incident") (block 806). Subsequent to block 806, the method 800 may proceed to block 810, discussed below. When the report does not correspond to an existing incident (no at block 804), the safety analysis engine 120 may generate a new incident (e.g., information stored in a standardized format describing a new incident based on information included in the report) as discussed above (block 808). Subsequent to block 808, the method 800 may proceed to block 810, discussed below.

At block 810, the safety analysis engine 120 may correlate the new or supplemented incident with additional incidents and one or more patterns stored within one or more databases associated with the safety analysis engine 120. At block 812, based on the results of the correlation, the safety analysis engine 120 may determine a pattern ("the selected pattern") having at least a predetermined threshold of similarity with one or more incidents. At block 814, the safety analysis engine 120 may determine one or more portions (e.g., events) of the selected pattern that have not yet occurred ("the predicted next event"). At block 816, the safety analysis engine 120 may generate and transmit alert(s) to one or more users, objects, assets, authorities, or social media platforms, wherein the alert(s) include the predicted next event.

Figure 9:
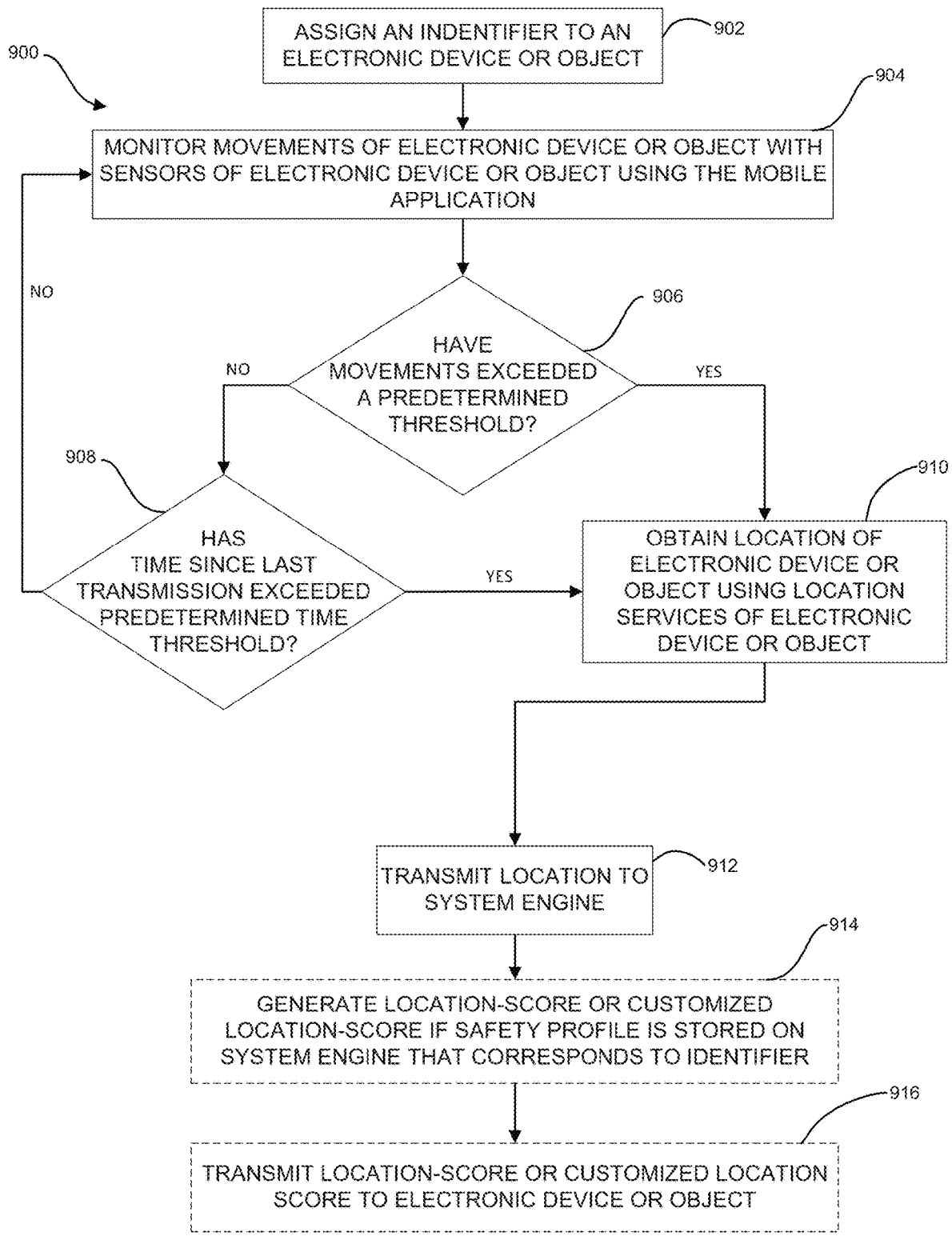
FIG. 9 is a flowchart illustrating an exemplary method for performing a location-tracking process using a mobile application (e.g., mobile application 1012 shown in FIG. 10).

Referring to FIG. 9, a flowchart illustrating an exemplary method for performing a battery-saving location-tracking process using a mobile application (e.g., the mobile application 1012 of FIG. 10) is shown. Each block illustrated in FIG. 9 represents an operation that may be performed in the method 900 of performing location-tracking using the mobile application 1012. The method 900 may be a battery-saving location-tracking process as the method 900 does not require (but may include) constant transmission of location data via a location services component, e.g., of the operating system, installed on the electronic device on which the mobile application 1012 is installed. In contrast, as will be discussed below, the method 900 may transmit location data at limited instances, e.g., when movements of the electronic device exceed a predetermined threshold. The determination and transmission of the location of an electronic device is typically a battery power-intensive process resulting in a drain of the battery. By monitoring one or more sensors of the electronic device for measurements exceeding predetermined thresholds, and determining and transmitting the location of the electronic device when a measurement exceeds the corresponding threshold, the method 900 avoids relying on frequent determination and transmission of location data when the electronic device is not in motion. Therefore, as compared to other location-tracking processes that require constant, or frequent, transmission of location data from an electronic device to a server or other networking device, the method 900 may be a battery-saving location-tracking process. Referring to FIG. 9, at block 902, the safety analysis engine 120 may assign an identifier to an electronic device or object (for convenience, the term "electronic device" will be used to mean both the electronic device and the object, additionally, the electronic device may be a network device). In one embodiment, the identifier may be tied solely to the electronic device such that the user of the electronic device may remain anonymous to the safety analysis engine 120 (i.e., when the electronic device is not tied to a profile of the user stored on the safety analysis engine 120). At block 904, the mobile application 1012 monitors the movements of the electronic device. For example, the mobile application 1012 may have access to one or more sensors or components of the electronic device (e.g., an accelerometer, a compass, a gyroscope, a GPS, etc.). In one embodiment, the sensors may enable a user to approximate the height of an event based on an angle relative to the ground at which the electronic device may be pointed to record a video or capture a picture of the event (e.g., differentiate between smoke coming from a window on the first story of a building compared to a window on the tenth floor). At block 906, the mobile application 1012 may determine whether the monitored movements have exceeded a predetermined threshold (e.g., have moved a predetermined distance since the last transmission of location information of the electronic device). When the monitored movements have not exceeded the predetermined threshold (no at block 906), the mobile application 1012 may determine whether the time since the last transmission of the location of the electronic device to the safety analysis engine 120 has exceeded a predetermined time threshold (block 908). When the time since the last transmission of the location of the electronic device has not exceeded the predetermined time threshold (no at block 908), the method 900 may return to block 904. When the time since the last transmission of the location of the electronic device has exceeded the predetermined time threshold (yes at block 908), the method 900 may proceed to block 910. Referring back to block 906, when the monitored movements have exceeded the predetermined threshold (yes at block 906), the method 900 may proceed to block 910.

At block 910, the mobile application 1012 may obtain the location of the electronic device (e.g., using the location services installed on the electronic device that utilize the GPS of the electronic device). At block 912, the mobile application 1012 may transmit the location of the electronic device to the safety analysis engine 120 which may store the location. Alternatively, or in addition, the safety analysis engine 120 may optionally generate a location-score or customized location-score, when the safety profile corresponding to the electronic device (or user thereof) is stored in the safety-profile database 135 (block 914). At block 916, the safety analysis engine 120 optionally transmits the location-score or customized location-score to the electronic device. For example, the method 900 may differentiate between a first scenario in which minor vibrations are sensed due to an electronic device being placed on a table and a second scenario in which a user picks up the electronic device and moves to a different location. Thus, the rules of thresholds, e.g., as part of rules in determining when to transmit location information, may aid to save battery-life of the electronic device.

IV. Logical Representation

FIG. 10 shows a logical representation of an exemplary system (e.g., system 100 shown in FIG. 1). The system may include an engine (e.g., engine 120) stored in the persistent storage 1006 of the server device 1000, a mobile application 1012 stored on a mobile device 1010, and a website 1016 accessible by an electronic device 1014. The safety analysis engine (e.g., engine 120) may include a plurality of logic components and databases. The server device 1000 may include the persistent storage 1006, processor(s) 1002 and communication interface 1004. The server device 1000 may be made entirely or partially of a hardened material (e.g., hardened plastic, metal, glass, composite or any combination thereof) that protects circuitry within the housing, namely the one or more processors 1002 that are coupled to the communication interface 1004 and the persistent storage 1006. The communication interface 1004, in combination with communication interface logic 121, may enable communications with external network devices, e.g., the mobile device 1010 and the electronic device 1014, to receive and transmit data. According to one embodiment of the disclosure, the communication interface 1004 may be implemented as a physical interface including one or more ports for wired connectors. Additionally, or in the alternative, the communication interface 1004 may be implemented with one or more radio units for supporting wireless communications with other electronic devices. The communication interface logic 121 may include logic for performing operations of receiving and transmitting data via the communication interface 1004 to enable communication between the safety analysis engine and one or more network devices via the a network (e.g., the internet or a LAN) and/or cloud computing services.

The processor(s) 1002 may be further coupled to persistent storage 1006. According to one embodiment of the disclosure, the persistent storage 1006 may include (a) the communication interface logic 121, (b) the report generation logic 122, (c) the report evaluation logic 123, (d) the incident determination logic 124, (e) the location-score generation logic 125, (f) the safety-profile logic 126, (g) the alert generation logic 127, (h) the categorizing logic 128, (i) the pattern detection logic 129, (j) the event prediction logic 130 and/or (k) the user-location tracking logic 131. Additionally, the safety analysis engine (e.g., engine 120) may include the following databases: (i) the received data and reports database 132, (ii) the incident database 133, (iii) the location-score database 134, (iv) the safety profile database 135, (v) the catalogs database 136, (vi) the pattern database 137 and/or (vii) the information layer database 138. Of course, when implemented as hardware, one or more of these logic components and/or databases could be implemented in combination and/or separately from each other. The system (e.g., system 100) may also include the mobile application 1012 and the website 1016. The mobile application 1012 may be downloaded and installed on the mobile device 1010 and access one or more sensors or storage devices of the mobile device 1010. The website 1016 may be accessed from any electronic device, such as the electronic device 1014, that is configured to connect or capable of connecting to the internet.

V. Graphical User Interface of the System

Figures 11A, 11B, 11C:
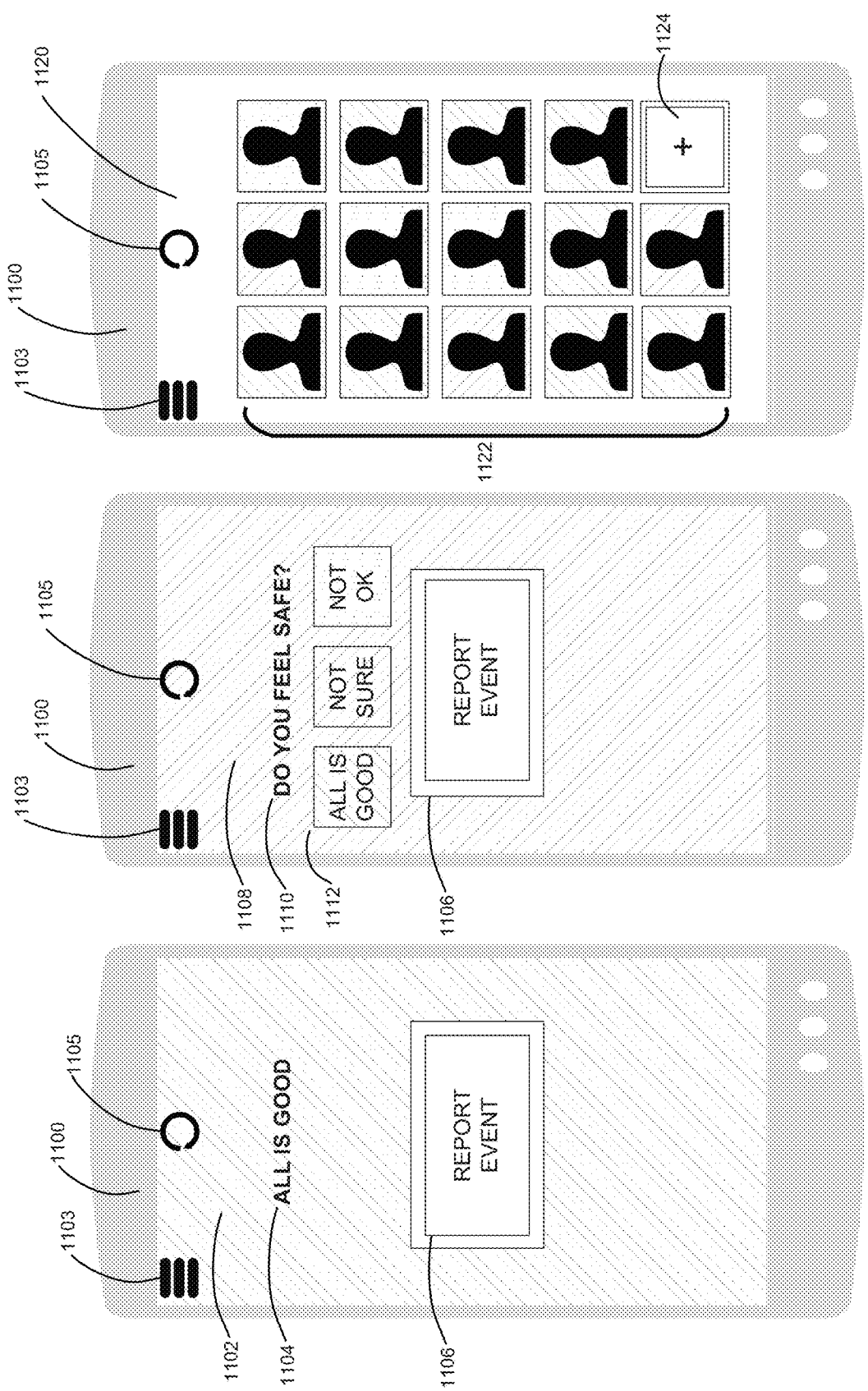
FIG. 11A is an exemplary illustration of an exemplary network device configured with and displaying a first display screen generated by an exemplary mobile application (e.g., mobile application 1012 shown in FIG. 10).
FIG. 11B is a second exemplary illustration of the exemplary network device of FIG. 11A configured with and displaying a second display screen generated by an exemplary mobile application (e.g., mobile application 1012 shown in FIG. 10).
FIG. 11C is a third exemplary illustration of the exemplary network device of FIG. 11A configured with and displaying a third display screen generated by an exemplary mobile application (e.g., mobile application 1012 shown in FIG. 10).

Referring to FIG. 11A, an exemplary illustration of a first network device configured with and displaying a first display screen generated by a mobile application (e.g., the mobile application 1012 of FIG. 10) is shown. In FIG. 11A, the network device is represented by, as an illustrative example, a mobile phone 1100, but other devices may be similarly used. The mobile phone 1100 is shown to include an outer housing and a display. The outer housing may contain circuitry, e.g., one or more processors, one or more storage devices and logic components. Additionally, the mobile phone 1100 may be configured with the mobile application 1012. The mobile application 1012 may be, for example, downloaded via a network connection and installed on the mobile phone 1100, and include logic that, upon execution by the one or more processors of the mobile phone 1100, may perform operations such as collecting and transmitting data, as discussed above, as well as generating one or more display screens. The display screen 1102 may include a first background pattern that is based on one of a location-score or a customized location-score (i.e., indicates a level of safety). In one embodiment, the first background pattern may be a color, a pattern of lines, or any other graphical indication. The first background pattern may represent a first level of safety, wherein a second background pattern (not shown) may represent a second level of safety, the first level of safety being different than the second level of safety. As an illustrative example, the first background pattern may be the color green that indicates a first level of safety (e.g., safe), a second background pattern may be the color that indicates a second level of safety (e.g., neutral), and a third background pattern may be the color red that indicates a third level of safety (e.g., in danger). The mobile application 1012 may be configured to generate the display screen 1102 including a background pattern corresponding to a location-score or a customized location-score in response to receiving the location-score or the customized location-score from the safety analysis engine 120. The display screen 1102 may also include text 1104 that describes the location-score or the customized location-score. For example, the text "All is good," may correspond to a high safety level (e.g., safe) and be paired with a background pattern indicating high safety level (e.g., green as used in the illustrative example above). The display screen 1102 may also include an icon 1106 that is configured to enable the user of the mobile phone 1100 to report an event. Herein, the icon 1106 is represented by a box; however, the scope of the invention is not so limited and the icon 1106 may be represented by any graphical representation that is configured to enable the user to report an event (e.g., provide data to the safety analysis engine 120). By activating the icon 1106 (e.g., herein utilizing the touch-screen functionality of the mobile phone 1100 to select the icon 1106), the user may be guided through one or more questions that are configured to efficiently collect data from the user and/or mobile phone 1100, as discussed above with respect to at least FIG. 3. The icon 1103 may represent a menu icon (e.g., providing access to the application settings, safety profile settings, etc.) and the icon 1105 may represent a refresh icon (e.g., transmit a request to the safety analysis engine 120 to generate a location-score or a customized location-score at the current time).

Referring to FIG. 11B, a second exemplary illustration of the first network device configured with and displaying a second display screen generated by a mobile application (e.g., the mobile application 1012 of FIG. 10) is shown. As in FIG. 11A, FIG. 11B illustrates the mobile phone 1100 configured with the mobile application 1012. FIG. 11B illustrates the mobile phone 1100 having the display screen 1108, which includes text 1110, a group of icons 1112 and the icon 1106. The text 1110 asks the user to provide input regarding to how safe he or she feels. The group of icons 1112 provide the three possible answers to the question presented by the text 1110 ("All is good"; "Note sure"; and "Not OK"). Each of the icons within the group of icons may be configured to include a background pattern, as discussed above, that corresponds to the text indicating how safe the user feels. For example, the text icon displaying the text "All is good," may include a background color of green (e.g., representing a high safety level; thus, indicating the user feels safe). The user may respond to the question presented by the text 1110 by activating one of the icons of the group of icons 1112. Display screen 1108 may also include a background pattern different from the background pattern of display screen 1102 in FIG. 11A. The background pattern of display screen 1108 may correspond to the most recently received location-score or customized location-score.

Referring to FIG. 11C, a third exemplary illustration of the first network device configured with and displaying a third display screen generated by a mobile application (e.g., the mobile application 1012) of FIG. 10 is shown. As in FIGS. 11A and 11B, FIG. 11C illustrates the mobile phone 1100 configured with the mobile application 1012. FIG. 11C illustrates the mobile phone 1100 having the display screen 1120, which includes a plurality of icons 1122, wherein each icon represents a user (e.g., encompasses a user, an object or an asset). The user of the mobile phone 1100 may monitor the safety level of each user via the background pattern of each icon, for a quick view, or by activating an icon (e.g., clicking on the display of the mobile phone 1100 at the location of the icon) to view a larger view (e.g., in one embodiment, the larger view may be similar to the display screen 1102 in FIG. 11A). The display screen 1120 may include one or more icons corresponding to a user and a user may scroll left, right, up or down to display additional icons if applicable. Additionally, an icon 1124 may appear on the display screen 1120 to enable the user to add additional icons.

Additionally, the electronic device need not be a mobile phone but may take the form of any electronic device capable of installing a version of the mobile application 1012. Examples of alternative electronic devices include, but are not limited or restricted to, network devices, vehicle infotainment systems, smart watches, music players (e.g., Apple iPod®), tablets, phablets, etc.

Furthermore, the mobile application 1012 may be configured to display a map on a display screen and illustrate where certain safety objects or locations are as well as provide directions or navigation thereto ("safety map"). For example, such a map may include illustrations that highlight one or more defibrillators, first aid kits, etc.

Figure 12:
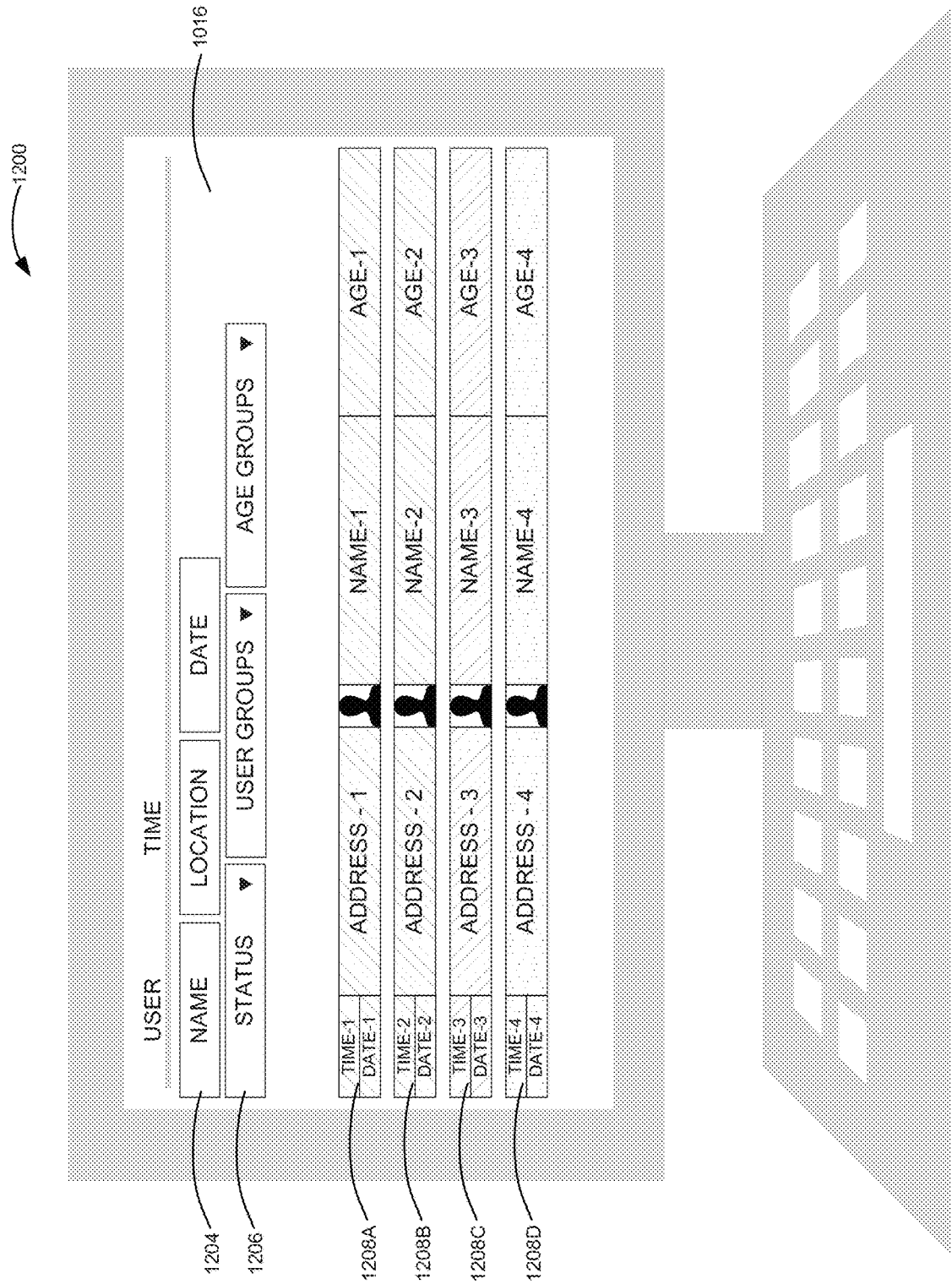
FIG. 12 is an exemplary illustration of another exemplary network device configured to access an exemplary website (e.g., website 1016 shown in FIG. 10).

Referring to FIG. 12, an exemplary illustration of a second network device configured to access the website 1016 of FIG. 10 is shown. In FIG. 12, the network device is represented by, as an illustrative example, a computer 1200 (but other devices may be similarly used). The computer 1200 is shown to include an outer housing including a display wherein the computer 1200 may be coupled to a keyboard. The computer 1200 may contain circuitry, e.g., one or more processors, one or more storage devices and logic components. Additionally, the computer 1200 may be configured to connect to a network, i.e., the internet, and access one or more websites via an internet browser. The website 1016 may include a plurality of search bars including a search bar to search for the safety level of a user by: name; location; and date. In addition, the website 1016 may include a plurality of dropdown boxes from which a user of the computer 1200 may make a selection to filter displayed users. The dropdown boxes may include the following options, inter alia: safety level; user group; age group.

Additionally, the website 1016 as seen in FIG. 12 may include a plurality of rows 1208A-1208D, wherein each row may correspond to a user and provides information associated with the safety level of the user. Specifically, each row—herein row 1208A will be discussed for convenience—may include a time and date of the last location-score generation for the user, referred to as "Name-1." In addition, the row 1208A may include an address for which the location-score was generated and an age of the user. Furthermore, the background pattern of the row 1208A may correspond to the safety level of the user having "Name-1." As discussed above with respect with FIGS. 11A-11C, the background pattern may vary based on the safety level of the user and take the form of varying colors or striped/dotted patterns, for example. Access to the mobile application 1012 and the website 1016 may be part of a Software as a Service (SaaS). The SaaS may be provided to large organizations (e.g., public or private corporations) that wish to monitor the safety level of employees. Additionally, the SaaS may be provided to governmental agencies or departments that wish to monitor the safety level of employees or public servants, including but not limited to politicians, judges, police offers, fire firefighters, etc.

The above systems, platforms, devices, features, aspects, methods, etc., have generally been described with respect to particular embodiments; however, the principles described may be applied to other types of systems, platforms, devices, features, aspects, methods, etc. Further, features, steps, etc., described in one embodiment above, including embodiments described in the Summary section, may generally be combined with features described in other embodiments herein.

Components, aspects, features, etc., of the systems, devices, methods, etc., described herein may be implemented in hardware, software, or a combination of both. Where components, aspects, features, etc., of the systems, devices, methods, etc., described herein are implemented in software, the software may be stored in an executable format on one or more non-transitory machine-readable mediums. Further, the software and related steps of the methods described above may be implemented in software as a set of data and instructions. A machine-readable medium includes any mechanism that provides (e.g., stores and/or transports) information in a form readable by a machine (e.g., a computer). For example, a machine-readable medium includes read only memory (ROM); random access memory (RAM); magnetic disk storage media; optical storage media; flash memory devices; DVD's, electrical, optical, acoustical or other forms of propagated signals (e.g., carrier waves, infrared signals, digital signals, EPROMs, EEPROMs, FLASH, magnetic or optical cards, or any type of media suitable for storing electronic instructions. Information representing the units, systems, and/or methods stored on the machine-readable medium may be used in the process of creating the units, systems, and/or methods described herein. Hardware used to implement the invention may include integrated circuits, microprocessors, FPGAs, digital signal controllers, stream processors, and/or other components.

While the invention has been described in terms of particular variations and illustrative figures, those of ordinary skill in the art will recognize that the invention is not limited to the variations or figures described. The features described with respect to one embodiment or variation may be used in other embodiments or variations. Methods described separately may be combined. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. Therefore, to the extent there are variations of the invention, which are within the spirit of the disclosure or equivalent to the inventions found in the claims, it is the intent that this patent will cover those variations as well.

What is claimed is:

1. A non-transitory storage medium having stored thereon logic, the logic being executable by one or more processors to perform operations including:
   receive data, from a first source being an electronic device by a security engine operating at a first server device, over a first wireless communication, wherein the data includes at least location information indicating a first location derived from an electronic sensor of the electronic device;
   analyze, by the security engine, the data received from the first source;
   generate, by the security engine, a report based on the data, the report containing event information associated with at least one event occurring at the first location, the event information assembled in a standardized format;
   access, by the security engine, stored information in a database to determine whether (1) the report corresponds to a known incident, or (2) the report corresponds to a new incident;
   responsive to determining the report includes new information corresponding to a known incident, supplement, by the security engine, existing incident information in the database that corresponds to the known incident with the new information regarding the known incident to generate updated existing incident information;
   responsive to determining the report corresponds to a new incident, generate new incident information regarding the new incident for storage in the database;
   responsive to (i) supplementing the stored information, or (ii) generating the new incident information, generate, by the security engine, a location-score for the first location based at least in part on the updated existing incident information or the new incident information, wherein generating the location-score is performed through machine-learning techniques in accordance with weighted values of events corresponding to a geographic region surrounding the first location; and
   transmit, via a second wireless communication, the location-score to a network device, the network device configured to (i) stored on non-transitory, computer-readable medium therein a safety profile corresponding to a user, and (ii) apply the safety profile to the location-score to generate a custom location-score personalized to the user according to the safety profile such that results of application of the safety profile remain on the network device enabling contents of the safety profile to remain unknown to the security engine, wherein the custom location-score is configured for display on a display screen of the network device.

2. The storage medium of claim 1, wherein the logic is also executable by the one or more processors to perform operations including to generate an alert to a user that includes the location-score or is indicative of the location-score.

3. The storage medium of claim 1, wherein the known incident includes multiple events, wherein each event of the multiple events occurred or is occurring within a narrow-range location encompassing the first location, and wherein generating the location-score includes performing an analysis on information regarding the multiple events, the analysis being at least one of a rules-based analysis or a machine-learning analysis.

4. The storage medium of claim 1, wherein the database includes information regarding multiple incidents that have occurred or are occurring within either a narrow-range location or a broad-range location encompassing the first location, wherein the multiple incidents include the first incident, and wherein generating the location-score includes performing an analysis on the information regarding the multiple incidents, the analysis being at least one of a rules-based analysis or a machine-learning analysis.

5. The storage medium of claim 1, wherein the location-score is an updated location-score that is updated from a previous location-score for the first location.

6. The storage medium of claim 1, wherein the data is received from the first source over a channel, and wherein the channel has been assigned a trust score that is associated with the data.

7. The storage medium of claim 1, wherein the logic is also executable by the one or more processors to perform operations including:
   analyze additional data received from a second source;
   generate a second report based on the additional data, the second report containing additional event information associated with at least one event that occurred or is occurring at the first location, the additional event information assembled in the standardized format;
   access the updated existing incident information in the database;
   responsive to determining the second report corresponds to the first incident and that the second report includes additional new information regarding the first incident, supplement the updated existing incident information with the additional new information; and
   generate an updated location-score for the first location based at least in part on the updated existing incident information after it has been supplemented with the additional new information regarding the first incident.

8. A computerized method for generating a location-score, the method comprising:
   receiving data, from a first source being an electronic device by a security engine operating at a first server device, via a first wireless communication, wherein the data includes at least location information indicating a first location derived from an electronic sensor of the electronic device;
   generating, by the security engine, a report based on the data, the report containing event information associated with at least one event occurring at the first location, the event information assembled in a standardized format;
   accessing, by the security engine, stored information in a database to determine whether (1) the report corresponds to a known incident, or (2) the report corresponds to a new incident;
   responsive to determining the report includes new information corresponding to a known incident, supplementing, by the security engine, existing incident information in the database that corresponds to the known incident with the new information regarding the known incident to generate updated existing incident information;

responsive to determining the report corresponds to a new incident, generating new incident information regarding the new incident for storage in the database;

responsive to supplementing the stored information or responsive to generating the new incident information, generating, by the security engine, a location-score for the first location based at least in part on the updated existing incident information or the new incident information, wherein generating the location-score is performed through machine-learning techniques in accordance with weighted values of events corresponding to a geographic region surrounding the first location;

transmitting, via a second wireless communication, the location-score to a network device remote from the first server device; and applying, by logic of the network device, a safety profile corresponding to a user to the location-score to generate a custom location-score personalized to the user according to the safety profile, wherein the safety profile is stored on non-transitory, computer-readable medium of the network device such that results of application of the safety profile remain on the network device enabling contents of the safety profile to remain unknown to the security engine, wherein the custom location-score is configured for display on a display screen of the network device.

9. The computerized method of claim 8, further comprising generating an alert for transmission to the user that includes the location-score or is indicative of the location-score.

10. The computerized method of claim 8, wherein the known incident includes multiple events, wherein each event of the multiple events occurred or is occurring within a narrow-range location encompassing the first location, and wherein generating the location-score includes performing an analysis on information regarding the multiple events, the analysis being at least one of a rules-based analysis or a machine-learning analysis.

11. The computerized method of claim 8, wherein the database includes information regarding multiple incidents that have occurred or are occurring within either a narrow-range location or a broad-range location encompassing the first location, wherein the multiple incidents include the first incident, and wherein generating the location-score includes performing an analysis on the information regarding the multiple incidents, the analysis being at least one of a rules-based analysis or a machine-learning analysis.

12. The computerized method of claim 8, wherein the location-score is an updated location-score that is updated from a previous location-score for the first location.

13. The computerized method of claim 8, wherein the data is received from the first source over a channel, and wherein the channel has been assigned a trust score that is associated with the data.

14. The computerized method of claim 8, further comprising:
analyzing additional data received from a second source;
generating a second report based on the additional data, the second report containing additional event information associated with at least one event occurring at the first location, the additional event information assembled in the standardized format;
accessing the updated existing incident information in the database;
responsive to determining the second report corresponds to the first incident and that the second report includes additional new information regarding the first incident, supplementing the updated existing incident information with the additional new information; and
generating an updated location-score for the first location based at least in part on the updated existing incident information after it has been supplemented with the additional new information regarding the first incident.

15. A computerized method for evaluating how safe a user is, the method comprising:
receiving, by a security engine operating at a first server device, a trigger to generate a location-score, the trigger including an indication that the user is at a location at a time;
accessing, by the security engine, stored information in a database, wherein the stored information relates to one or more incidents within a predefined area including the location;
performing, by the security engine, an analysis on the stored information to generate the location-score for the location, the location-score providing an indication of how safe the location is based at least in part on the stored information relating to the one or more incidents, wherein generating the location-score is performed through machine-learning techniques in accordance with weighted values of events corresponding to a geographic region surrounding the location of the user; and
applying, by logic of a mobile device of the user, a safety profile corresponding to the user to the location-score to generate a custom location-score personalized to the user according to the safety profile, wherein the safety profile is stored on non-transitory, computer-readable medium of the mobile device such that results of application of the safety profile remain on the mobile device enabling contents of the safety profile to remain unknown to the security engine.

16. The computerized method of claim 15, further comprising generating an alert for transmission to the user that includes, or is indicative of, one or more of the location-score or the customized location-score.

17. The computerized method of claim 15, wherein performing the analysis includes performing at least one of a rules-based analysis or a machine-learning analysis.

18. The computerized method of claim 15, wherein the location-score is an updated location-score that is updated from a previous location-score for the location.

19. The computerized method of claim 15, further comprising generating a second alert that includes, or is indicative of, one or more of the location-score or the customized location-score, wherein the second alert is transmitted to one or more additional users listed in a predefined list.

20. The computerized method of claim 15, wherein the safety profile includes detailed characteristics of the user that influence how safe the user is in the location.

* * * * *